US012732326B2

(12) United States Patent
Pushkarna et al.

(10) Patent No.: US 12,732,326 B2
(45) Date of Patent: Sep. 8, 2026

(54) COMMUNICATION APPARATUS AND COMMUNICATION METHOD FOR OVERHEAD REDUCTION OF WLAN SENSING

(71) Applicant: Panasonic Intellectual Property Corporation of America, Torrance, CA (US)

(72) Inventors: Rajat Pushkarna, Singapore (SG); Rojan Chitrakar, Singapore (SG); Hong Cheng Michael Sim, Singapore (SG); Yanyi Ding, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 274 days.

(21) Appl. No.: 18/553,965

(22) PCT Filed: Mar. 4, 2022

(86) PCT No.: PCT/SG2022/050114
§ 371 (c)(1),
(2) Date: Oct. 4, 2023

(87) PCT Pub. No.: WO2022/216225
PCT Pub. Date: Oct. 13, 2022

(65) Prior Publication Data

US 2024/0187189 A1 Jun. 6, 2024

(30) Foreign Application Priority Data

Apr. 9, 2021 (SG) ............................ 10202103674S

(51) Int. Cl.
*H04L 5/00* (2006.01)
*H04W 72/542* (2023.01)
*H04W 84/12* (2009.01)

(52) U.S. Cl.
CPC .......... *H04L 5/0051* (2013.01); *H04L 5/0057* (2013.01); *H04W 72/542* (2023.01); *H04W 84/12* (2013.01)

(58) Field of Classification Search
None
See application file for complete search history.

(56) References Cited

U.S. PATENT DOCUMENTS

2017/0346547 A1* 11/2017 Stager ..................... H04L 25/03
2018/0123727 A1* 5/2018 Yu ......................... H04W 24/10
(Continued)

OTHER PUBLICATIONS

Doostnejad et al., "Opportunistic Implicit Channel Sounding," IEEE 802.11-20-0086-r1, Intel Corporation, Feb. 27, 2020, 13 pages.
(Continued)

*Primary Examiner* — Phirin Sam
(74) *Attorney, Agent, or Firm* — Seed Intellectual Property Law Group LLP

(57) ABSTRACT

Apparatuses and methods for providing multiple structures and methods to enable minimising the use of sounding and related frame exchanges for wireless local area network (WLAN) sensing in order to reduce sounding overhead are provided. The techniques disclosed here feature a communication apparatus including a transceiver and circuitry. The transceiver, in operation, receives signals from a WLAN. The circuitry, in operation, demodulates and decodes the signals, the decoded signals comprising a first physical layer protocol data unit (PPDU) and a second PPDU, wherein the circuitry, in operation, performs full channel measurement based on a first physical layer (PHY) header of the first
(Continued)

PPDU and a second PHY header of the second PPDU, wherein the first PHY header and the second PHY header include long training fields (LTFs) for estimating channel quality.

14 Claims, 29 Drawing Sheets

(56) References Cited

U.S. PATENT DOCUMENTS

2018/0167997 A1* 6/2018 Yoshimura ............ H04W 84/12
2019/0045461 A1* 2/2019 Fang ................... H04W 52/245
2019/0173794 A1* 6/2019 Merlin ................ H04W 74/006
2020/0136884 A1* 4/2020 Park .................... H04L 27/2602
2020/0162963 A1* 5/2020 Alpert ....................... H04L 1/06
2020/0305231 A1 9/2020 Sadeghi et al.
2020/0359416 A1* 11/2020 Ko .................... H04W 74/0808
2021/0007006 A1* 1/2021 Chen ..................... H04L 1/1887
2021/0044407 A1 2/2021 Lomayev et al.
2021/0273757 A1* 9/2021 Shellhammer ........ H04L 5/0044
2021/0306271 A1* 9/2021 Xin ..................... H04L 47/2416
2022/0255693 A1* 8/2022 Lou ....................... H04L 5/0085
2022/0279602 A1* 9/2022 Xue ........................ H04L 65/80
2023/0362991 A1* 11/2023 Ko ....................... H04B 17/318
2025/0158855 A1* 5/2025 Yang .................. H04L 27/2617
2025/0226944 A1* 7/2025 Lomayev ............ H04L 25/0224

OTHER PUBLICATIONS

International Search Report mailed May 9, 2022, for International Application No. PCT/SG2022/050114, 5 pages.

Restuccia, "IEEE 802.11bf: Toward Ubiquitous Wi-Fi Sensing," Department of Electrical and Computer Engineering, Northeastern University, US, Mar. 27, 2021, 7 pages.

Sun et al., "Threshold based sensing measurement," doc.: IEEE 802.11-21/0351r2, Huawei Technologies Co. Ltd, Mar. 9, 2021. (14 pages).

Indian Office Action, dated Jul. 29, 2026, for Indian Patent Application No. 202327066909. (8 pages) (with English translation).

* cited by examiner

400

500

1500

3200

COMMUNICATION APPARATUS AND COMMUNICATION METHOD FOR OVERHEAD REDUCTION OF WLAN SENSING

BACKGROUND

1. Technical Field

The present disclosure relates generally to wireless local area network (WLAN) communication, and more particularly relates to communication apparatuses and communication methods for overhead reduction of WLAN sensing.

2. Description of the Related Art

Communication apparatuses are prevalent in today's world in the form of phones, tablets, computers, cameras, digital audio/video players, wearable devices, game consoles, telehealth/telemedicine devices, and vehicles providing communication functionality, and various combinations thereof. The communication may include exchanging data through, for example, a wireless local area network (WLAN) system, a cellular system, a satellite system, and various combinations thereof.

WLAN sensing applications typically perform channel measurements and track one or more wireless links over time to classify channel variations into events/activities. Since Channel State Information (CSI) provides information that describes how wireless signals propagate in the channel with the various effects such as time delay, amplitude attenuation, and phase shift on each subcarrier, CSI measurements may be utilized for WLAN Sensing.

In WLAN communication CSI is calculated based on long training fields (LTFs) from the physical layer (PHY) header. The difference between the transmitted LTF and the received LTF is the channel state information. The receiver estimates the CSI matrix using a pre-defined signal and a received signal after receive processing such as removing cyclic prefix, demapping, and OFDM demodulation.

According to current WLAN specifications, channel measurements are performed using LTFs from a null data packet (NDP). Consider an example scenario, where sensing needs to be performed 10 times in a beacon interval. Sounding may take up to approximately one millisecond during a beacon interval. Some applications of WLAN sensing may require very frequent channel measurements which may significantly increase the number of soundings. According to WLAN sensing use cases, a good number of scenarios are expected to have a maximum sensing overhead of ten percent. If channel measurements take place more than ten times in a beacon interval for one initiator and one responder scenario, the sensing overhead may be more than ten percent. With multiple initiators and responders, the network overhead for sensing may increase significantly.

Thus, there is a need for communication apparatuses and communication methods for overhead reduction of WLAN sensing to alleviate the aforementioned issues by minimising the use of sounding and related frame exchanges for WLAN sensing in order to reduce sounding overhead. Furthermore, other desirable features and characteristics will become apparent from the subsequent detailed description and the appended claims, taken in conjunction with the accompanying drawings and this background.

SUMMARY

One non-limiting and exemplary embodiment facilitates providing multiple structures and methods to enable minimising the use of sounding- and related frame exchanges for wireless local area network (WLAN) sensing in order to reduce sounding overhead.

In an embodiment, the techniques disclosed herein feature a communication apparatus including a transceiver and circuitry. The transceiver, in operation, receives signals from a WLAN. The circuitry, in operation, demodulates and decodes the signals, the decoded signals comprising a first physical layer protocol data unit (PPDU) and a second PPDU, wherein the circuitry, in operation, performs full channel measurement based on a first physical layer (PHY) header of the first PPDU and a second PHY header of the second PPDU, wherein the first PHY header and the second PHY header include long training fields (LTFs) for estimating channel quality.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following, exemplary embodiments are described in more detail with reference to the attached figures and drawings.

FIG. 2, comprising FIGS. 2A and 2B, show block diagrams of exemplary communication apparatuses, wherein FIG. 2A depicts an exemplary wireless station (STA) communication apparatus, and FIG. 2B depicts a wireless access point (AP);

FIG. 10, comprising FIGS. 10A and 10B, is illustrations of sensing procedure in accordance with the present disclosure when multiple responders cross their thresholds at the same time, wherein FIG. 10A is an illustration of the sensing procedure and FIG. 10B is a diagram of an NDPA frame used int eh sensing procedure;

FIG. 16, comprising FIGS. 16A and 16B, is depicts threshold setup in accordance with the present disclosure, wherein FIG. 16A depicts an illustration of threshold setup and FIG. 16B depicts a diagram of a threshold management frame in accordance with the present disclosure;

FIG. 24, comprising FIGS. 24A and 24B, is diagrams of frames used in the collaborative sensing procedure of FIGS. 22 and 23 in accordance with the present disclosure, wherein FIG. 24A depicts a sensing control frame and FIG. 24B depicts a NDPA frame;

FIG. 27, comprising FIGS. 27A and 27B, are diagrams of PPDUs used in the sensing procedure of FIG. 26 in accordance with the present disclosure, wherein FIG. 27A depicts a diagram of an extra high throughput (EHT) PPDU and FIG. 27B depicts a diagram of a high throughput (HT) PPDU;

Skilled artisans will appreciate that elements in the figures are illustrated for simplicity and clarity and have not necessarily been depicted to scale.

DETAILED DESCRIPTION

The following detailed description is merely exemplary in nature and is not intended to limit the exemplary embodiments or the application and uses of the exemplary embodiments. Furthermore, there is no intention to be bound by any theory presented in the preceding background or the following detailed description. It is the intent of the present disclosure to present exemplary embodiments of communication apparatuses and communication methods for overhead reduction of WLAN sensing by minimising the use of sounding and related frame exchanges for WLAN sensing in order to reduce sounding overhead.

Figure 1:
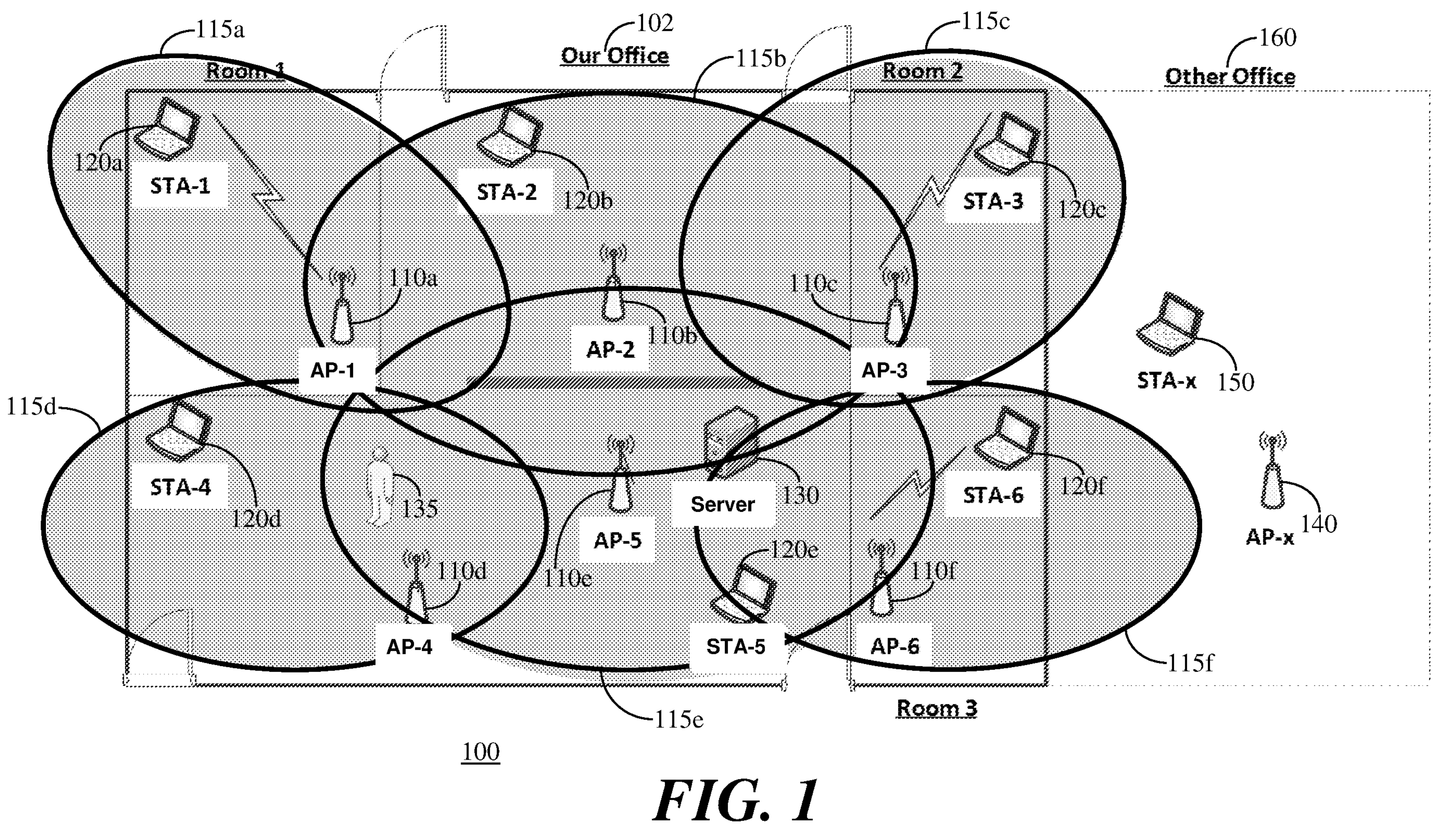
FIG. 1 shows an exemplary wireless local area network (WLAN) system and communication apparatuses operating.

FIG. 1 is an illustration 100 which depicts an exemplary WLAN system in an office 102. Each access point (AP) 110*a*, 110*b*, 110*c*, 110*d*, 110*e*, 110*f* has a corresponding area of service (Basic Service Set (BSS)) 115*a*, 115*b*, 115*c*, 115*d*, 115*e*, 115*f*. In a dense WLAN environment such as the in the office 102, the location of the APs 110*a*, 110*b*, 110*c*, 110*d*, 110*e*, 110*f* will be defined to have overlapping areas of service 115*a*, 115*b*, 115*c*, 115*d*, 115*e*, 115*f* as shown in the illustration 100 for improved service coverage. Within the areas of service 115*a*, 115*b*, 115*c*, 115*d*, 115*e*, 115*f*, wireless stations (STAs) 120*a*, 120*b*, 120*c*, 120*d*, 120*e*, 120*f* communicate with the APs 110*a*, 110*b*, 110*c*, 110*d*, 110*e*, 110*f*. The APs 110*a*, 110*b*, 110*c*, 110*d*, 110*e*, 110*f* communicate with a server 130 to provide internet, intranet and other resources for the STAs 120*a*, 120*b*, 120*c*, 120*d*, 120*e*, 120*f*. A person 135 in the area of service 115*d* may affect the channel between the STA 120*d* and the AP 110*d* as discussed hereinafter. A second office 160 has an AP located therein which communicates with a STA 150.

Figure 2A:
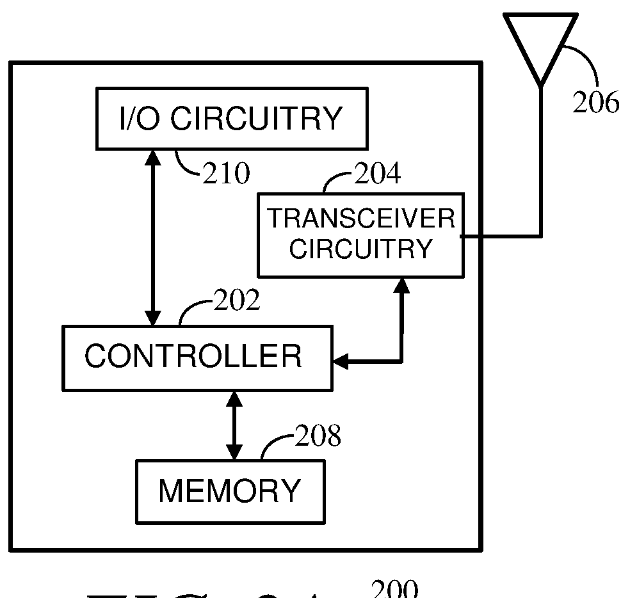

The wireless stations (STAs) 120 are communication apparatuses operating in a WLAN system. FIG. 2A is a block diagram 200 of an exemplary STA 120. The STA 120 may comprise a device such as a controller 202 which is coupled to a communication device, such as a transceiver 204, connected to an antenna 206 for performing a function of communication as described in the present disclosure. For example, the STA 120 may comprise the controller 202 that generates control signals and/or data signals which are used by the transceiver 204 to perform a communication function of the STA 120. The STA 120 may also comprise a memory 208 coupled to the controller 202 for storage of instructions and/or data for generation of the control signals and/or data signals by the controller 202. The STA 120 may also include input/output (I/O) circuitry 210 coupled to the controller 202 for receiving input of data and/or instructions for storage in the memory 208 and/or for generation of the control signals and/or data signals and for providing output of data in the form of audio, video, textual or other media.

Figure 2B:
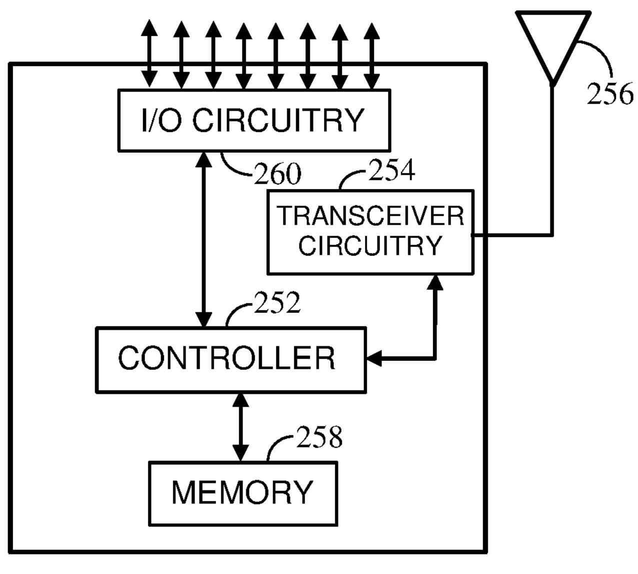

The STAs 120 communicate with the access points (APs) 110 in the WLAN system 100 to access resource units (RU) via the server 130 for exchanging data with the internet, other communication apparatuses or other systems. FIG. 2B is a block diagram 250 of an exemplary AP 110. The AP 110 comprises an infrastructure facility which communicates with or controls the STAs 120*a*, 120*b*, 120*c*, 120*d*, 120*e*, 120*f* such as those illustrated in FIG. 2A or other communication apparatuses. The AP 110 may comprise a device such as a controller 252 which is coupled to a communication device, such as a transceiver 254, connected to an antenna 256, for performing a function of communication as described in the present disclosure. For example, the AP 110 may comprise the controller 252 that generates control signals and/or data signals which are used by the transceiver 254 to perform a communication function of the AP 110 with the STAs 120. The AP 110 may also comprise a memory 258 coupled to the controller 252 for storage of instructions and/or data for generation of the control signals and/or data signals by the controller 252. The AP 110 may also include input/output (I/O) circuitry 260 coupled to the controller 252 for coupling with various RUs provided, for example, by the server 130 and for receiving input of data and/or instructions for storage in the memory 258 and/or for generation of the control signals and/or data signals to enable communication between the STAs 120 and the RUs.

Conventional WLAN sensing applications perform channel measurements and track one or more wireless links over time to classify channel variations into events/activities. Since Channel State Information (CSI) provides information that describes how wireless signals propagate in the channel with the various effects such as time delay, amplitude attenuation, and phase shift on each subcarrier, CSI has been utilized as a channel measurement parameter for WLAN Sensing. The difference between a transmitted long training field (LTF) and a received LTF is the CSI. The receiver estimates a CSI matrix "H" using a pre-defined signal 'x' and a received signal 'y' after receive processing such as removing cyclic prefix, demapping, and OFDM demodulation. The estimated CSI is the three-dimensional matrix H of complex values.

Figure 3:
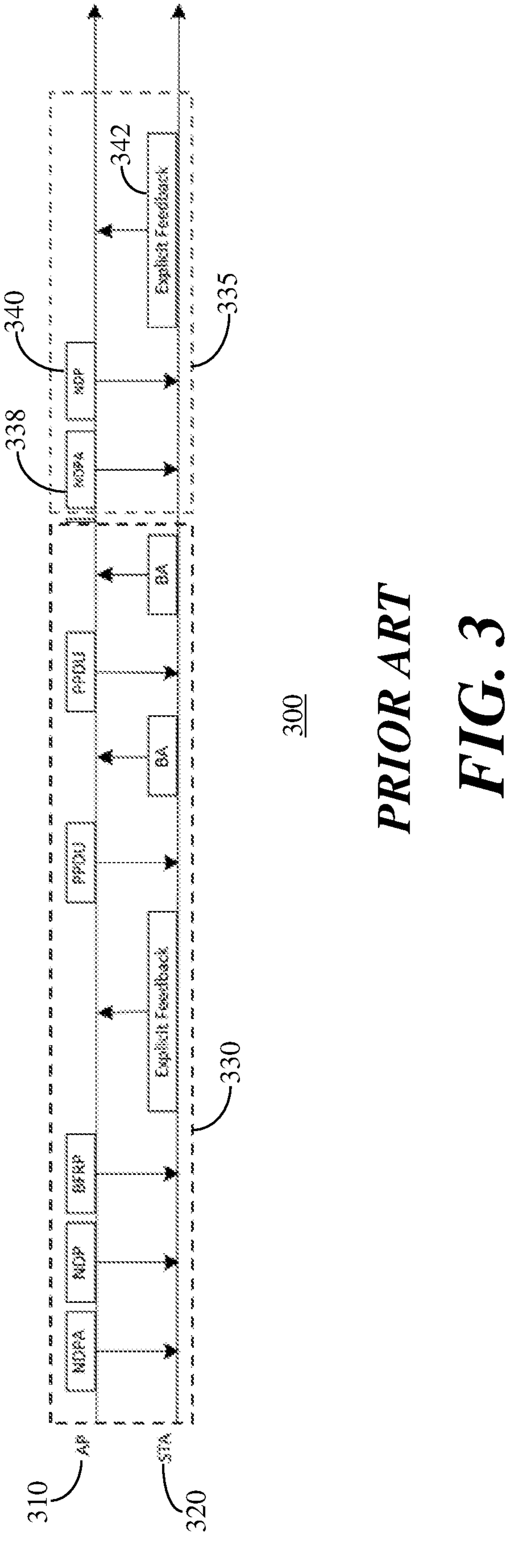
FIG. 3 is an exemplary illustration of conventional WLAN sensing during communication between an access point (AP) and a wireless station (STA) in a WLAN system.

FIG. 3 depicts an exemplary illustration 300 of conventional WLAN sensing during communication between an AP 310 and a STA 320 in a WLAN system. After the regular communication 330, WLAN sensing 335 is performed. According to the current specifications, channel measurements are performed using LTFs from a null data packet (NDP) 340. In the illustration 300, the AP 310 is assumed to be the sensing initiator and the STA 320 is assumed to be the sensing responder. Table 1 depicts sensing airtime when sensing is performed in a beacon interval:

TABLE 1

| Frame | Airtime [in usec] |
|---|---|
| Sensing Request | 76 |
| NDPA 338 | 76 |
| NDP 340 | 100 |
| Explicit Feedback 342 | 756 |
| Total | 1008 |

As shown in Table 1, sounding may take up to approximately one millisecond (1 ms) during a beacon interval. Some applications of WLAN sensing may require very frequent channel measurement which may significantly increase the number of soundings. In accordance with conventional WLAN sensing, a sensing overhead maximum of ten percent is expected in a one initiator and one responder scenario. In the exemplary wireless local area network system 102 (FIG. 1) with multiple initiators and responders, the network overhead for WLAN sensing may increase significantly. WLAN sensing in accordance with the present disclosure minimizes the use of sounding and related frame exchanges for WLAN sensing in order to reduce sounding overhead.

Figure 4:
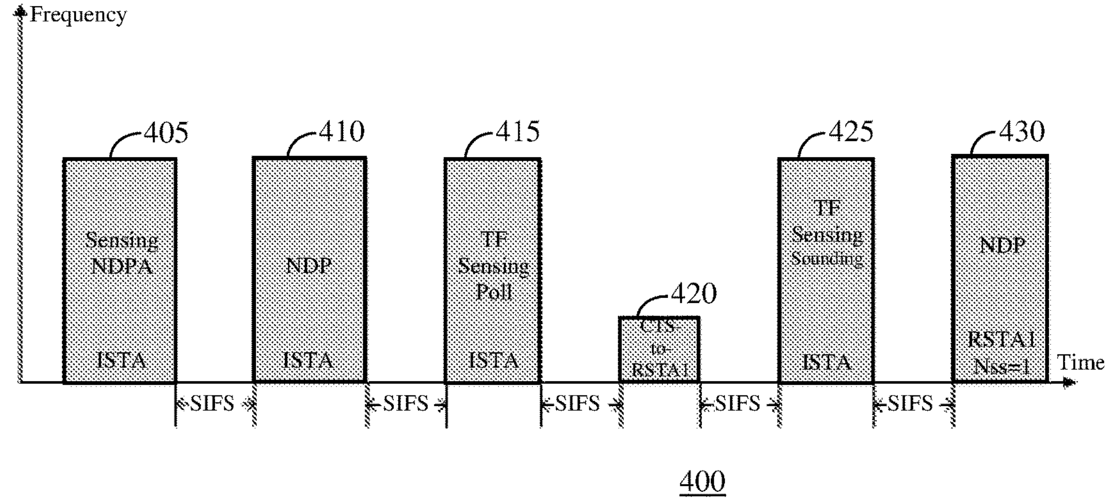
FIG. 4 is an illustration of a conventional threshold-based feedback mechanism for WLAN sensing.

FIG. 4 depicts an illustration 400 of a conventional threshold-based feedback mechanism for WLAN sensing. The initiator STA (ISTA) sets the threshold for each responding STA by transmitting a sensing NDPA 405 and, after a short interframe space (SIFS), periodically transmits the NDP 410 to all RSTAs. In response to a Trigger Frame (TF) Sensing Poll 415, a responding STA (RSTA1) sends a "clear to send" 420 to the ISTA. In response to a TF Sensing Sounding 425, the RSTA1 measures the CSI and compares it with a previous measurement result. If the CSI difference exceeds a threshold, the RSTA1 sends a NDP 430 to the ISTA (scheduling may be needed). Otherwise, the RSTA1 stores the measurement result and feedbacks nothing. The ISTA can do the sensing measurement within itself based on the NDP 430 sent by the responding STA. In this conventional WLAN sensing, to perform channel measurement for checking whether the threshold is crossed, the NDP sounding is performed which may disadvantageously act as an overhead and additional frame exchange to regular communication.

Figure 5:
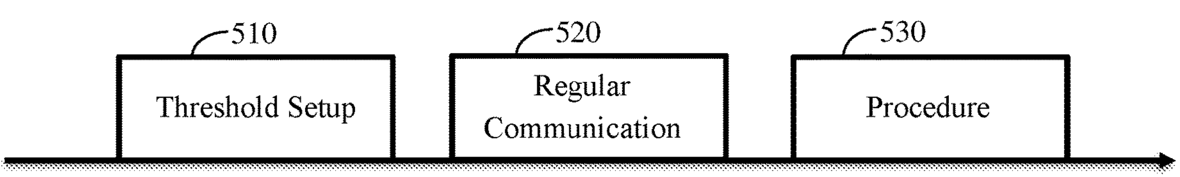
FIG. 5 is an illustration of three phases of a method for WLAN sensing in accordance with the present disclosure.

FIG. 5 is an illustration 500 of a method for channel sounding to reduce overhead and network load in accordance with the present disclosure. The method for channel sounding in accordance with the present disclosure includes three phases 510, 520, 530. A STA performs channel measurement based on regular physical layer protocol data units (PPDUs) received from another STA to check whether the threshold has been crossed. If the threshold is crossed, the STA performs a full channel measurement. Accordingly, a first phase of the method for WLAN sensing in accordance with the present disclosure is a threshold setup phase 510. During the threshold setup phase 510, the STA learns about the threshold above which full channel measurement should be performed. During a second regular communication phase 520, the STA performs channel measurement to extract the CSI and compares the value of the extracted CSI with a reference CSI value to determine from the difference in CSI values whether the threshold has been crossed. CSI is a channel measurement parameter which measures channel quality. In accordance with the present disclosure, other channel measurement parameters such as time reversal resonating strength (TRRS), signal-to-noise ratio (SNR) or detected channel energy could be extracted during performance of the channel measurement.

During a sensing procedure phase 530, the STA performs full channel measurement if the threshold has been crossed. The channel measurement may utilize regular PPDUs. By using a regular PPDU to determine whether the threshold has been crossed for channel measurement in accordance with the present disclosure significantly reduces sounding overhead.

Channel measurement based on a regular PPDU will be only for LTFs present in the PPDU which may be less than or equal to the number of Spatial Streams (SS) supported by the transceiver 204, 254, which may or may not estimate the complete channel. In accordance with the present disclosure, full channel measurement may also use NDP (any number of LTFs) or Staggered PPDU (a PPDU with extra LTFs) for sounding the complete channel.

Figure 6:
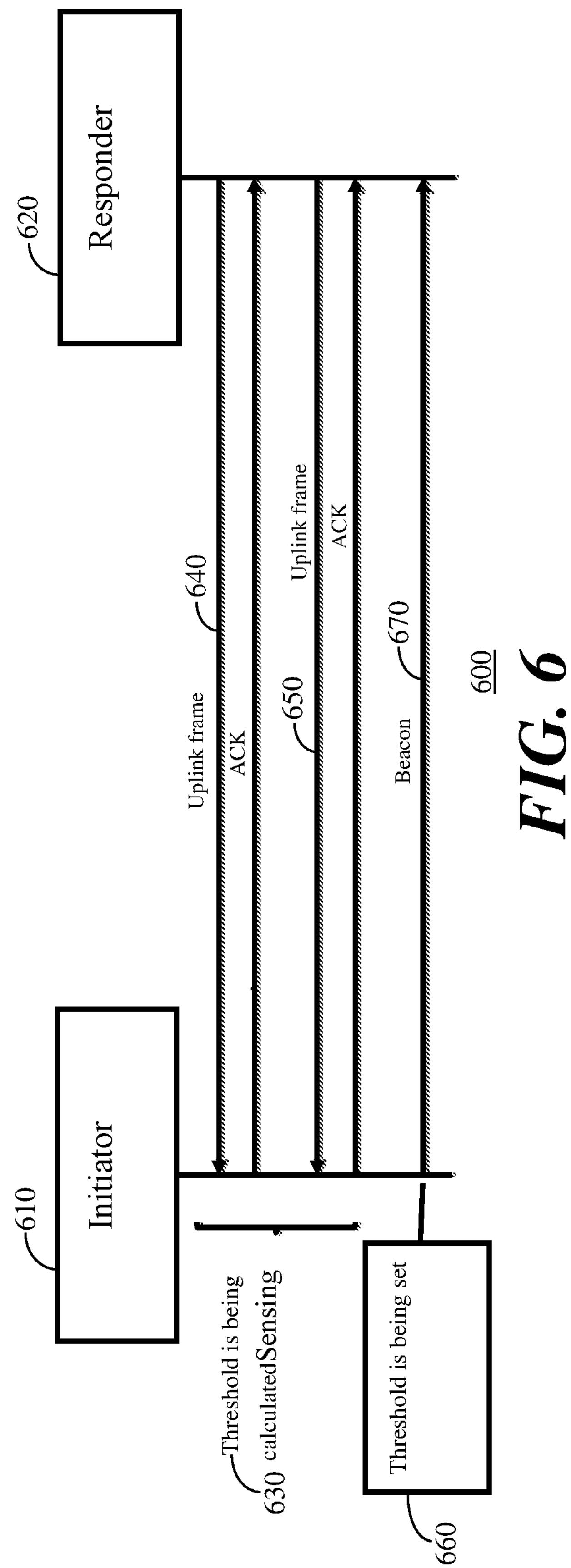
FIG. 6 is an illustration of initiator-responder communication for threshold calculation in accordance with the present disclosure.

Referring to FIG. 6, an illustration 600 of initiator-responder communication depicts threshold calculation in accordance with the present disclosure. Both an initiator 610 and a responder 620 can be either an AP110 or a STA 120. For the illustration 600, the initiator 610 is an AP and the responder 620 is one of the AP's associated STA(s).

The threshold is calculated 630 before WLAN sensing is performed and, in accordance with the present disclosure, is performed during an offline training phase. The offline training phase is a time before actual sensing is performed where the AP prepares a database of channel impulse responses with its associated STA(s). When the AP, as the initiator 610, receives an uplink frame 640 from the responder 620, the initiator 610 computes the channel impulse response. This step may be repeated at various time instances and locations to prepare a database of the CIRs (Channel Impulse Response) to have knowledge of localized objects in the environment within the AP's related area of service 115. Once the database is prepared, the AP, upon receiving another uplink frame 650, computes a time reversed CIR and convolves it with the CIR in the database. This will produce a maximum focusing gain for the intended responder 620 which is the threshold for that responder 620 and is set 660 by transmission 670 of a beacon frame or a unicast management frame from the initiator 610 to the responder 620 which includes the calculated threshold.

In accordance with the present disclosure, there may be two possible methods to calculate the threshold 630. The first method is a Time Reversal Resonating Strength (TRRS) calculation and the second method is a cross-correlation method. In accordance with the TRRS method, the CIRs can be calculated as shown in Equations (1) and (2):

$$h_1 = [h_1[0], h_1[1], \ldots h_1[L-1]] \tag{1}$$

$$h_2 = [h_2[0], h_2[1], \ldots h_2[L-1]] \tag{2}$$

where $h_1$ and $h_2$ are channel impulse responses (CIRs). The CIR $h_2$ is time reversed and convolved with the CIR $h_1$. Equation (3) calculates the threshold as a maximum of the time reversed and convolved $h_2$ with the various values in database is set as threshold.

$$\eta = \frac{maxi|(h1 * g2)[i]|}{\sqrt{\sum_{i=0}^{L-1} |h1(i)|^2} \sqrt{\sum_{i=0}^{L-1} |h2(i)|^2}} \tag{3}$$

Equation (3) reveals that the TR resonating strength is a maximal amplitude of entries of the cross-correlation between two complex CIRs. The main reason for using the TR resonating strength instead of the conventional correlation coefficient is to increase the robustness for the tolerance of channel estimation error.

The threshold can also be calculated by the cross-correlation method by simply using a correlation coefficient between the two channel impulse responses $h_1$ and $h_2$. To calculate the threshold, it is assumed that the initiator already has a database of CIRs and understands the location of the responder(s). The threshold is a value defined as the maximum of cross-correlation between two channel impulse responses.

Figure 7:
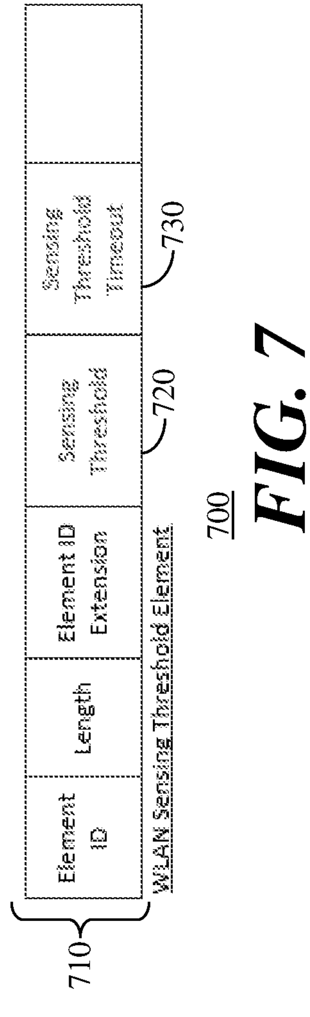
FIG. 7 is an illustration of a WLAN sensing threshold element in accordance with the present disclosure.

The AP, as the initiator 610, can set the threshold values to all the associated STA(s) participating in WLAN sensing using transmission 670 of a beacon frame or a unicast management frame. After the initiator 610 calculates the threshold(s) 630 for the responder(s) 620, the initiator 610 may set the threshold values according to the threshold setup phase 510 (FIG. 5) using a WLAN sensing element defined in accordance with the present disclosure. Referring to FIG. 7, an illustration 700 depicts a WLAN sensing element 710 which is used to indicate the threshold value to the responder (s) 620. The WLAN sensing element 710 includes a sensing threshold field 720 which includes the threshold value as a value between 0 and 100 in increments of 10 and a sensing threshold timeout field 730. The sensing threshold timeout field 730 indicates time after which full channel measurement may be performed, i.e., if none of the responders 620 (e.g., STAs) for which the threshold has been set crosses the threshold during a 'sensing threshold timeout', then the STA for which timeout has occurred may perform full channel measurement. The WLAN sensing element 710 may be carried in a beacon frame, as described above, or may be carried in other broadcast frames such as a probe response frame or a unicast management frame.

Figure 8:
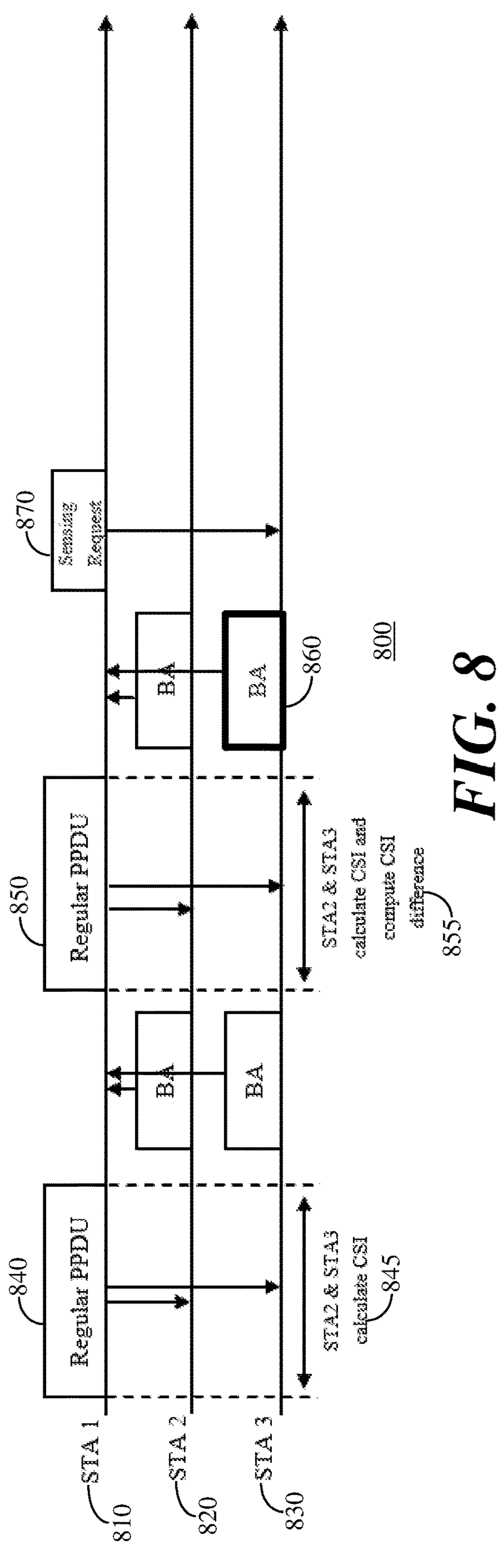
FIG. 8 is an illustration of a channel measurement scenario in accordance with the present disclosure.

Any PPDU during communication received at the responding STA can be used for channel measurement. The key point is the availability of a PHY header to estimate the channel quality using LTFs which are present in the PHY header. Referring to FIG. 8, an illustration 800 depicts a first channel measurement scenario involving three STAs, where STA1 810 is a sensing initiator wireless station and STA2 820 and STA3 830 are sensing responder wireless stations. STA2 820 and STA3 830 perform channel measurement based on LTFs from regular PPDUs 840, 850 received from STA1 810. STA2 820 and STA3 830 calculate 845 a CSI value and stores the CSI value. STA2 820 and STA3 830 calculate 855 a CSI difference for a subsequently calculated CSI value and the stored CSI value from previous measurements. If the CSI difference exceeds the threshold value, the responder STA (STA3 830) which crosses the threshold may indicate crossing the threshold to the initiator STA (STA1 810) using an uplink frame 860 in OFDMA communication, for example a Block Ack (BA) frame or a unicast action frame. The initiator STA (STA1 810) then sends a sensing request 870 to the responder STA which crossed the threshold (i.e., STA3 830).

WLAN sensing applications, like fall detection and motion detection, can be benefited if the CSI difference calculation 855 is computed between a current CSI value and an immediately preceding CSI value, as this calculation can provide instantaneous change in the CSI value for the initiator (STA1 810) to initiate full channel measurement when the threshold value is crossed.

Figure 9:
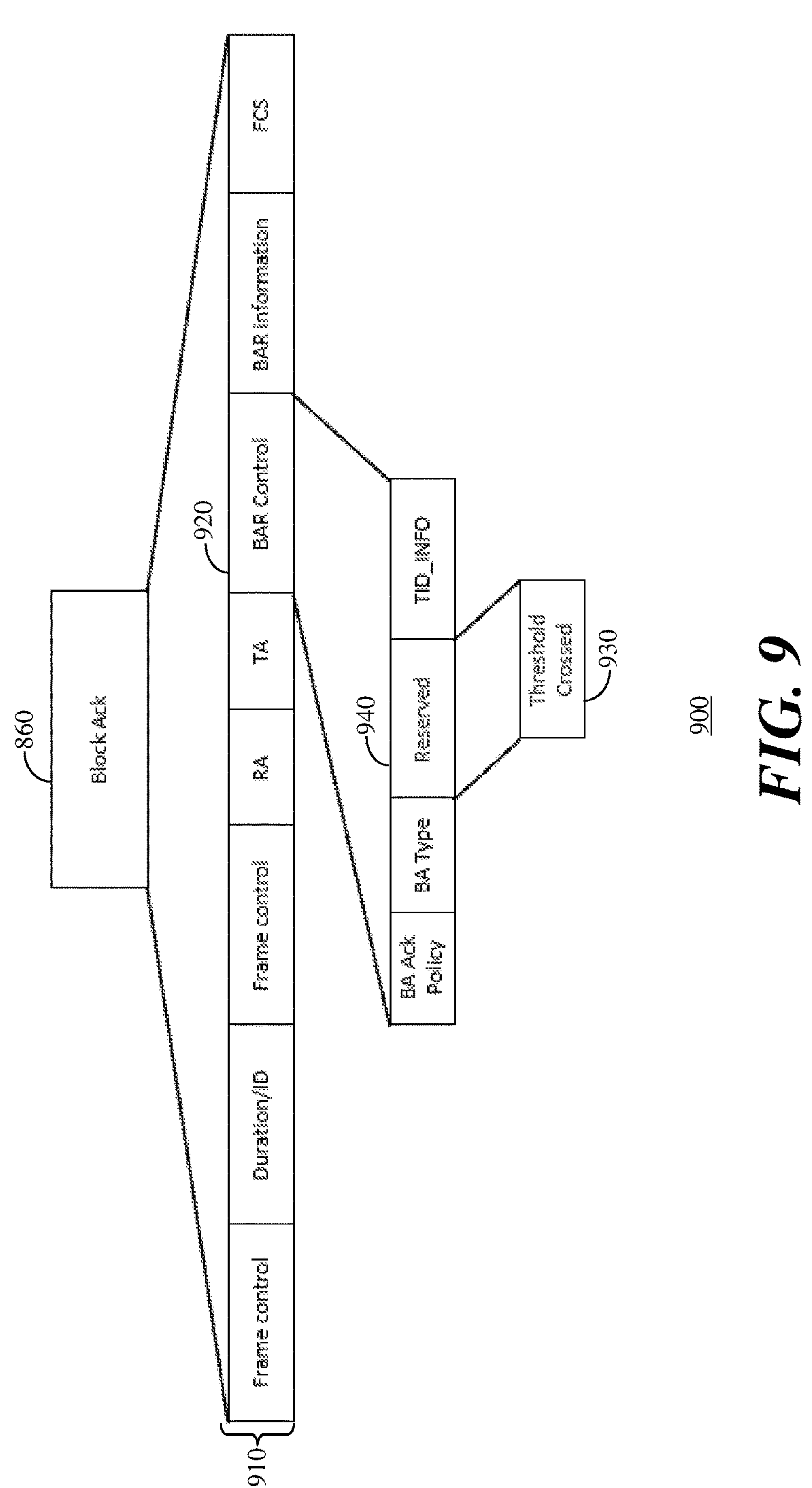
FIG. 9 is a diagram of a Block Ack frame which indicates crossing the threshold in accordance with the present disclosure.

Referring to FIG. 9, a diagram 900 depicts the Block Ack frame 910 of the Block Ack 860 in accordance with the present disclosure. The Block Ack frame 910 includes a Block Ack Request (BAR) control field (BAR Control) 920. When the responder 930 crosses the threshold, a threshold crossed bit is set in the Block Ack frame 910 in accordance with the present disclosure. One threshold control bit 930 may be used to indicate the threshold crossed from the reserved bits 940 in the BAR field 920 of the Block Ack frame 910.

Referring back to the illustration 800 (FIG. 8), when a sensing responder (e.g., STA3 830) indicates a threshold crossing, the initiator (STA1 810) may transmit a sensing request action frame to the responder to trigger a full channel measurement. In the sensing sequence of the illustration 800, STA1 810 (the initiator) transmits the Sensing Request frame 870 to STA3 830 (the responder) which has indicated crossing the threshold. In cases when multiple responders cross the threshold, the initiator may transmit the WLAN sensing request frame to the responders that have crossed the sensing threshold.

Figure 10A:
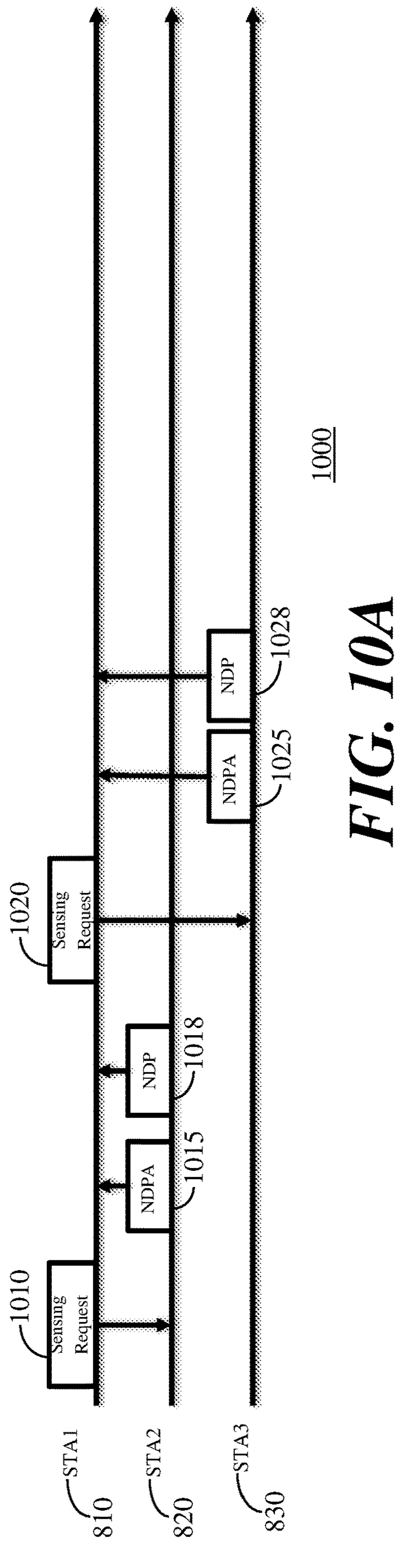

Referring to FIG. 10A, an illustration 1000 depicts a sensing procedure in accordance with the present disclosure when multiple responders cross their thresholds at the same time. Multiple responders STA2 820 and STA3 830 cross the threshold at the same time. The initiator STA1 810 sends out sensing requests 1010, 1020 to the STA(s) sequentially. The responder STAs, STA2 820 and STA3 830, in accordance with the present disclosure are sensing transmitters and sequentially send out NDP frames 1018, 1028 to the initiator STA (STA1 810) to perform channel measurement. Prior to sending out the NPA frames 1018, 1028, the responder STAs, STA2 820 and STA3 830, send out NDPA frames 1015, 1025 to indicate 'No Feedback' so that the initiator may not transmit an Explicit Feedback.

Figure 10B:
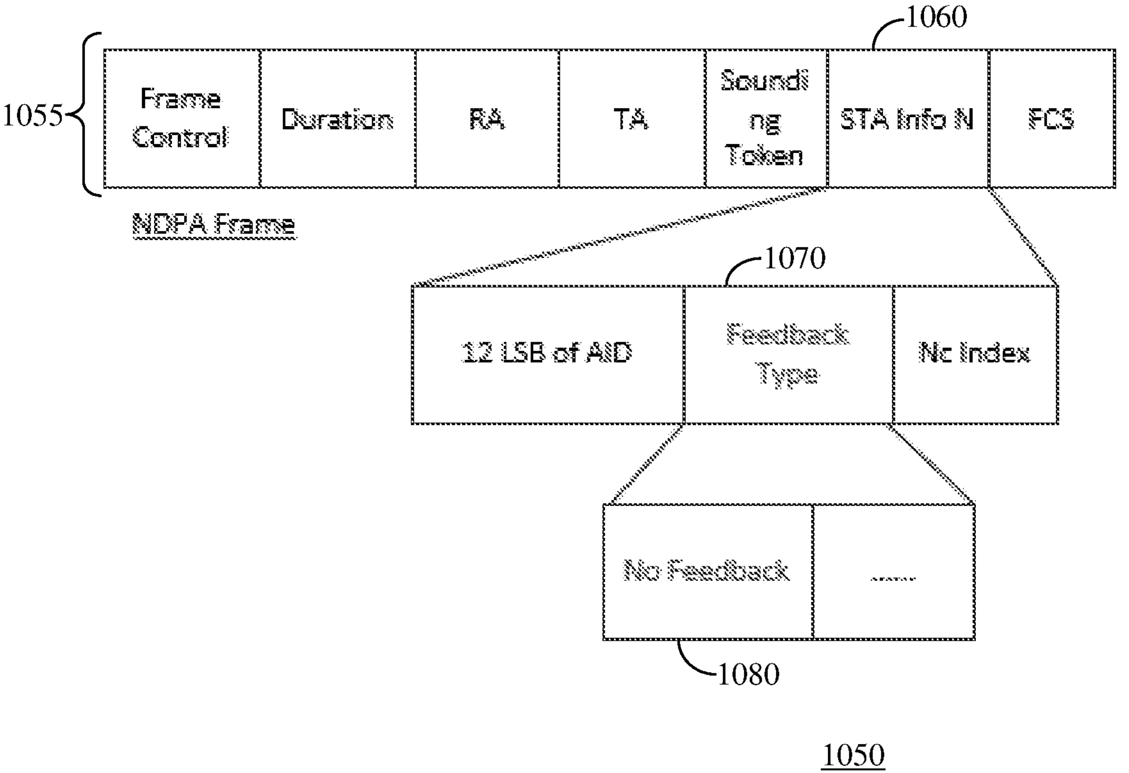

FIG. 10B is a diagram 1050 of an NDPA frame, such as NDPA frame 1015 or NDPA frame 1025, in accordance with the present disclosure. An STA Info field 1060 a Feedback Type subfield 1070 including information 1080 to indicate 'No Feedback'.

Figure 11:
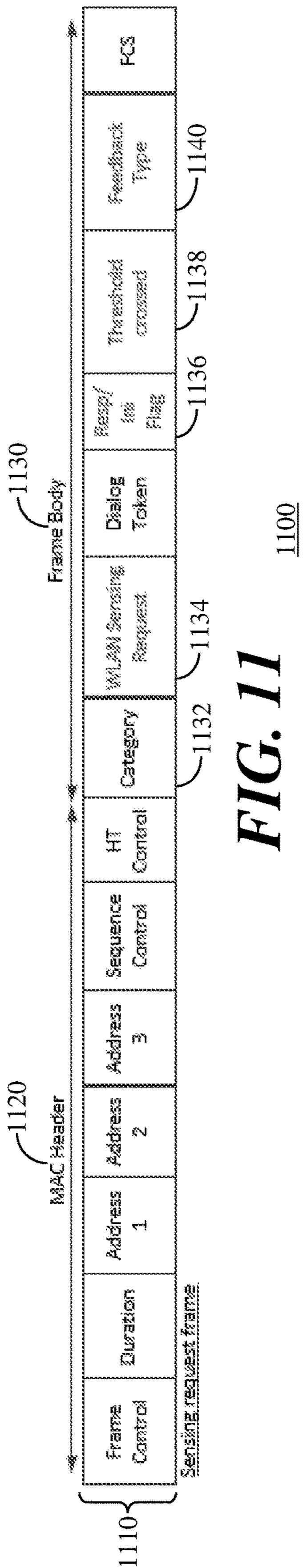
FIG. 11 is a diagram of a sensing request frame in accordance with the present disclosure.

Referring to FIG. 11, a diagram 1100 depicts a sensing request frame 1110 in accordance with the present disclosure. The sensing request frame 1110 includes a MAC header 1120 and a frame body 1130. The sensing request frame 1110 is defined as a management action frame and, in accordance with the present disclosure, the frame body 1130 includes a category field 1132, an action field 1134, a responder/initiator flag field 1136, a threshold crossed field 1138 and a feedback type field 1140. The category field 1132 is SENS and the action field 1134 is WLAN Sensing Request. The responder/initiator flag (Resp/Ini flag) field 1136 indicates whether the STA which has transmitted the frame is a responder or an initiator. The threshold crossed field 1138 indicates that the STA transmitting the sensing request frame 1110 has crossed their threshold. And the feedback type field 1140 determines the type of feedback during a sensing session. The feedback type field 1140 may be assigned one octet out of which two bits can be used to indicate a feedback type and other bits may be reserved for future use. Table 2 shows the types of feedback in accordance with the present disclosure.

TABLE 2

| Type of feedback | Indication |
|---|---|
| 0 (default) | NDP |
| 1 | Explicit Feedback |
| 2 | Partial Feedback |

Figure 12:
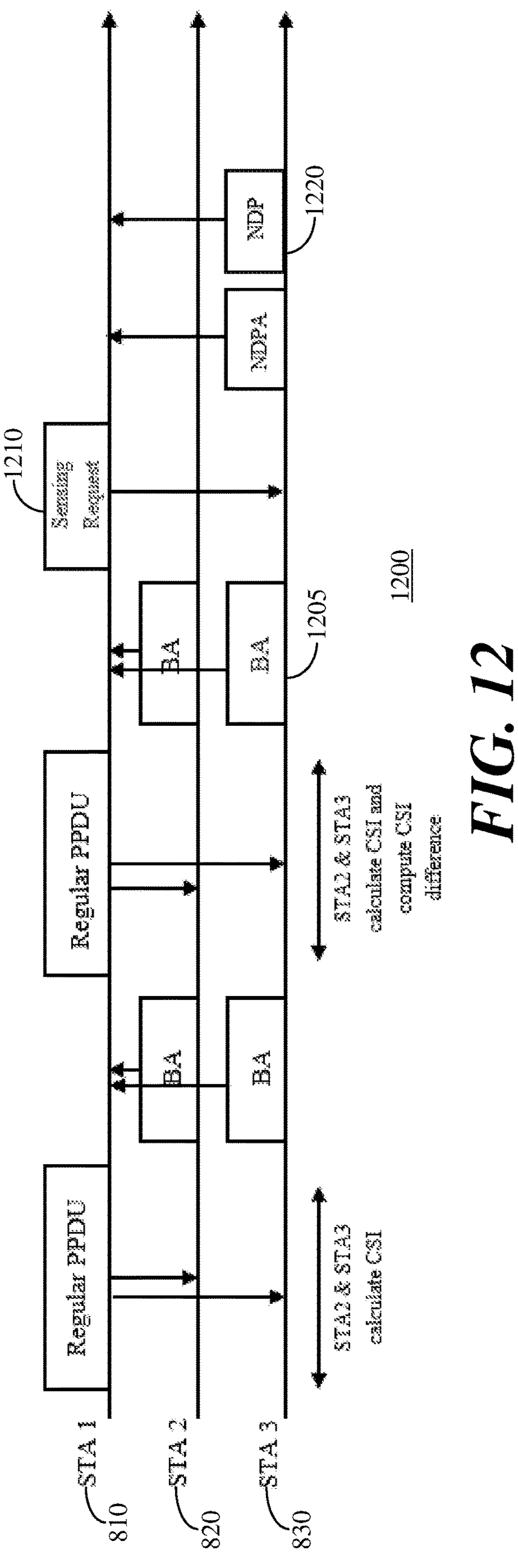
FIG. 12 is an illustration of a sensing procedure when a feedback type field is set to null data packet (NDP) in accordance with the present disclosure.

FIG. 12 depicts an illustration 1200 of a sensing procedure when a feedback type field 1140 in a sensing request frame 1110 is set to null data packet (NDP) in accordance with the present disclosure. The initiator (STA1 810), upon receiving the threshold crossing indication in the Block Ack 1205, transmits a sensing request 1210 in which the feedback type field 1140 in the sensing request frame 1110 is set to NDP to the responder (STA3 830) that has crossed the sensing threshold. In this case, the initiator STA1 810 performs the channel measurement itself upon receiving the NDP 1220 from the responder STA3 830.

Figure 13:
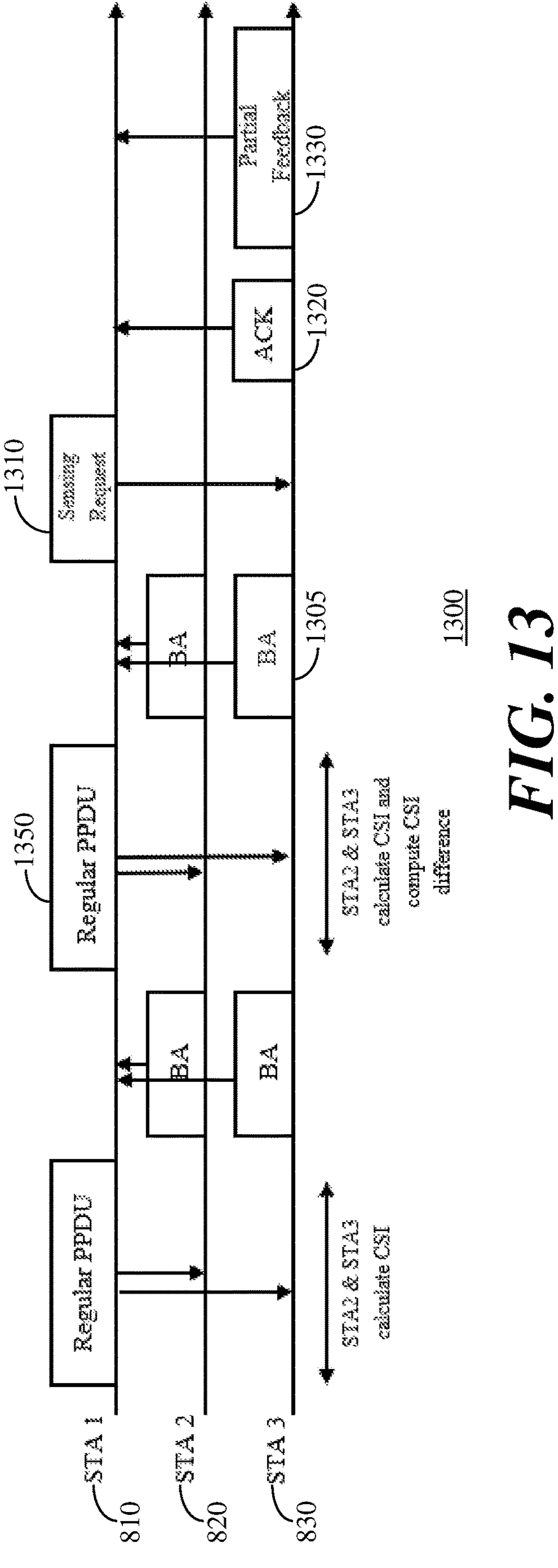
FIG. 13 is an illustration of a sensing procedure when a feedback type field is set to "Partial Feedback" in accordance with the present disclosure.

FIG. 13 depicts an illustration 1300 of a sensing procedure when a feedback type field 1140 in a sensing request frame 1110 is set to "Partial Feedback" in accordance with the present disclosure. The initiator (STA1 810), upon receiving the threshold crossing indication in the Block Ack 1305, transmits a sensing request 1310 in which the feedback type field 1140 in the sensing request frame 1110 is set to "Partial Feedback" to the responder (STA3 830) that has crossed the sensing threshold. After acknowledging 1320 the sensing request 1310, the responder STA3 830 transmits a partial feedback 1330 which is a part of stream information corresponding to the number of spatial streams (SSs) in the data section to the initiator STA1 810 based on the reception quality information of the LTF included in the non-NDP PPDU 1350. An initiator STA, such as STA1 810, may solicit a partial feedback depending on the sensing application. For example, in cases such as localization of objects or presence detection, partial feedback can be useful by making use of the fact that if the CSI for a SS related to data is changed, there may be some changes in the environment.

Figure 14:
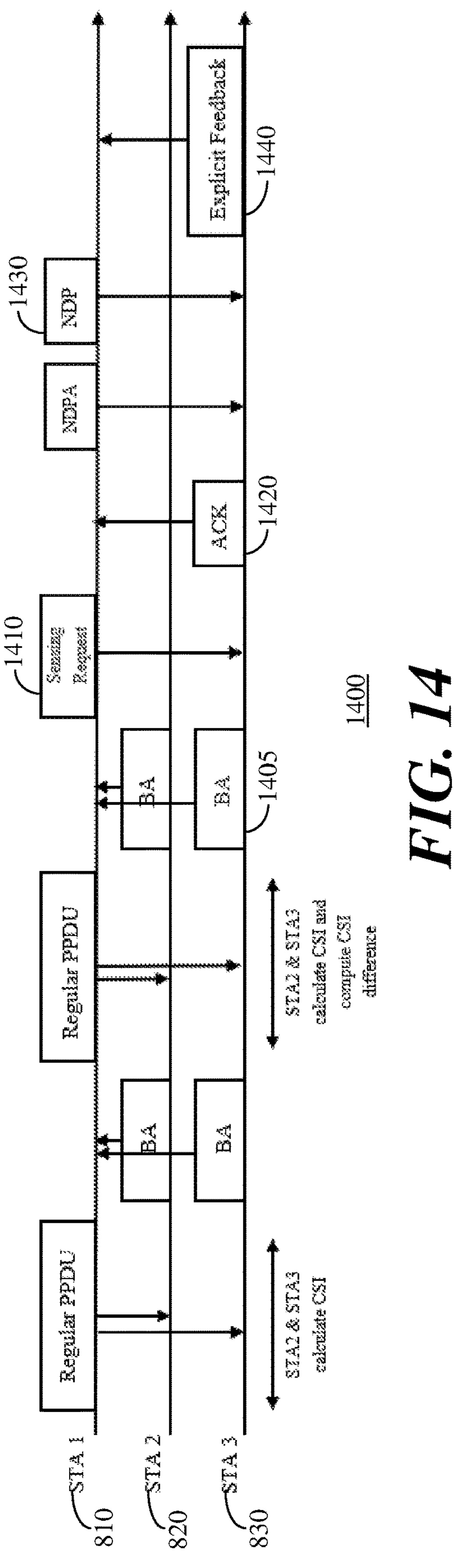
FIG. 14 is an illustration of a sensing procedure when a feedback type is set to "Explicit Feedback" in accordance with the present disclosure.

FIG. 14 depicts an illustration 1400 of a sensing procedure when a feedback type field 1140 in a sensing request frame 1110 is set to "Explicit Feedback" in accordance with the present disclosure. The initiator (STA1 810), upon receiving the threshold crossing indication in the Block Ack 1405, transmits a sensing request 1410 in which the feedback type field 1140 in the sensing request frame 1110 is set to "Explicit Feedback" to the responder (STA3 830) that has crossed the sensing threshold. When the initiator STA1 810 solicits explicit feedback from the responder STA3 830 and the responder STA3 830 acknowledges 1420, the initiator STA1 810 transmits a NDP frame 1430 to the responder STA3 830 indicating the responder STA3 830 perform full channel measurement and provide explicit channel measurement feedback 1440 to the initiator ST1 810. This scenario is helpful where the responding STA is a high computational device such as a smart TV or a laptop.

The initiator may also solicit channel measurement feedback 1440 from the responder based on a type of application. For applications requiring full channel measurement, the responder may transmit a NDP to the initiator and the initiator may perform full channel measurement on its own. The initiator may also solicit partial feedback 1330, based on the LTFs from the regular PPDU 1350. This may not be a complete channel measurement but can significantly reduce network load for certain applications such as automatic lighting. The initiator may also solicit explicit feedback 1440 from the responder which has crossed the threshold. In this case, the initiator may transmit the NDP 1430 to the responder to perform full channel measurement and transmit back the explicit feedback 1440. The initiator may also choose not to perform any measurement upon a threshold being crossed—in such cases the responder may save the result and continue with regular communication.

Figure 15:
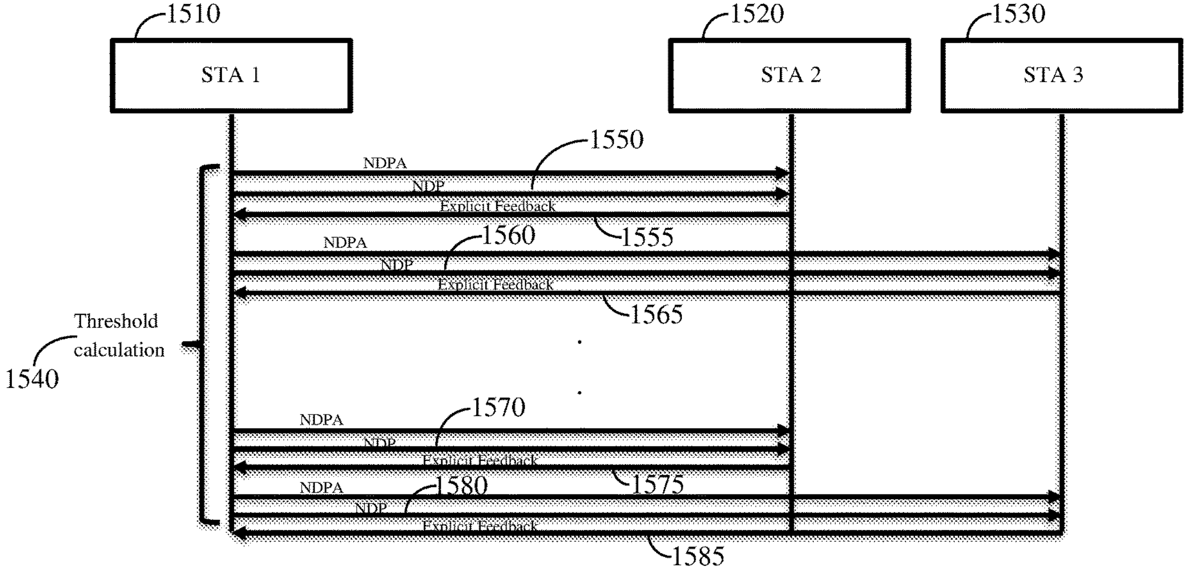
FIG. 15 is an illustration of communication between an initiator and multiple responders for threshold calculation in accordance with a variant of the present disclosure.

Referring to FIG. 15, an illustration 1500 depicts communication between an initiator STA1 1510 and multiple responders, STA2 1520 and STA3 1530, for threshold calculation 1540 in accordance with a variant of the present disclosure. In the illustration 1500, the threshold calculation initiator is an access point 110. The threshold calculation initiator STA1 1510 may send out NDPs 1550, 1560, 1570, 1580 to the responders STA2 1520 and STA3 1530 for the initiator STA1 1510 to estimate complete channel. This process can be repeated several times as shown in the illustration 1500. The responders STA2 1520 and STA3 1530 compute CSI and transmit explicit feedback 1555, 1565, 1575, 1585 which includes the calculated CSIs. The initiator STA1 1510 may choose a suitable CSI as a reference CSI. The choice of CSI value can be based on the application. For example, applications which are sensitive like fall detection or motion detection requiring rapid measurement may have a lower reference CSI value such as a minimum of the CSIs received from the responders STA2 1520 and STA3 1530 over time. For applications which do not require frequent measurement, like presence detection or intruder detection, may have a comparatively higher CSI value as reference such as a maximum of CSIs received from the responders STA2 1520 and STA3 1530 over time. The initiator STA1 1510 determines whether a threshold is crossed in response to a difference in CSI computed based on current measurement of CSI and the reference CSI.

Referring back to FIG. 8, when a sensing responder (e.g., STA3 830) indicates a threshold crossing in the Block Ack 860 sent to the initiator STA1 810, the initiator transmits a sensing request action frame 870 to the responder STA3 830 which has indicated crossing the threshold. Consider, for example, the AP 110 has set a threshold value as 70%. A subset of reference CSI comprising of SS in data PPDU are used to calculate a difference between a previous CSI 845 and a next CSI 855. Consider further where the difference is 69% and after ten iterations, the difference drops to 60%. While the threshold of 70% has not been crossed, the value of the CSI difference keeps dropping. In such a case, the threshold may pose a problem for sensing. To address this issue, a reference threshold value can be set by the AP/initiator in accordance with the present disclosure to determine the CSI difference (scheduling maybe required). If the CSI difference between the reset reference threshold value and a current CSI value exceeds the threshold, the responding STA can indicate threshold crossing to the AP.

Figure 16A:
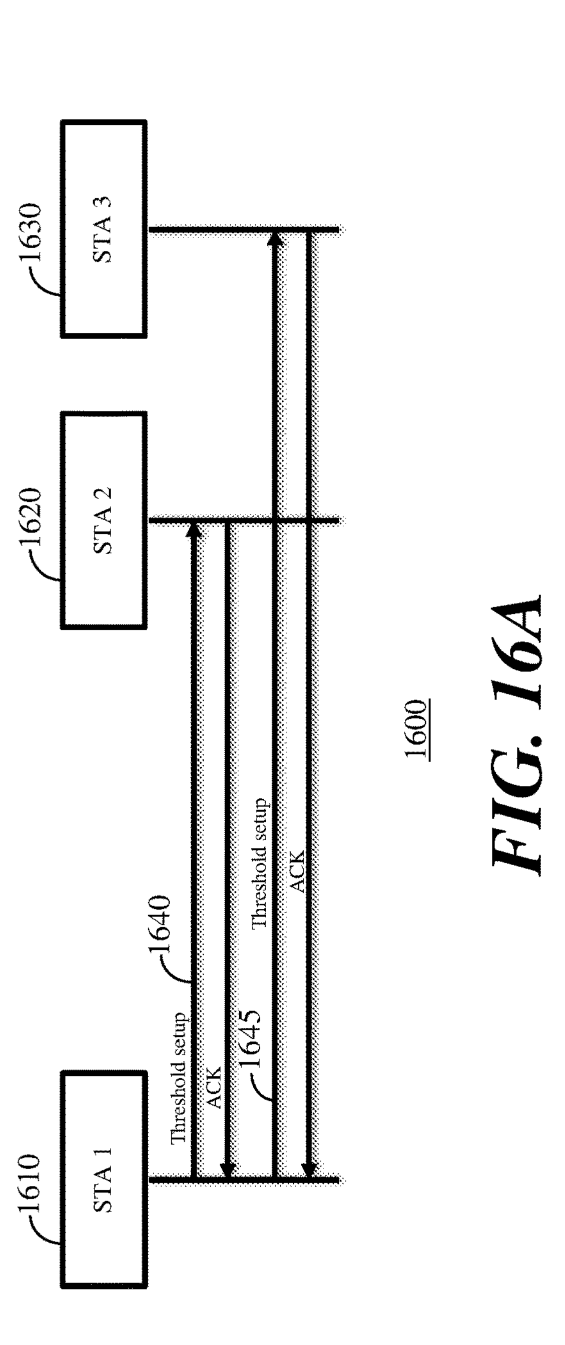

Referring to FIG. 16A, an illustration 1600 depicts threshold setup in accordance with a variant of the present disclosure. An initiator STA1 1610 uses threshold setup management frame 1660 to indicate a threshold for each responder (STA2 1620 and STA3 1630). Thus, the initiator STA1 1610 sends a first threshold setup 1640 to the responder STA2 1620 and sends a second threshold setup 1645 to the responder STA3 1630. In this manner, each responder may have a different threshold value providing better control over the threshold values for the responders and therefore providing better sensing capabilities.

Figure 16B:
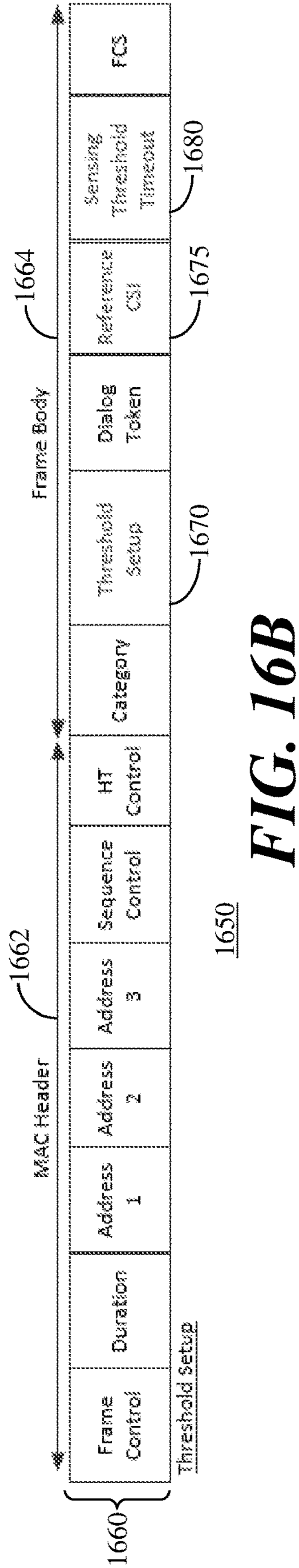

FIG. 16B depicts a diagram 1650 of a threshold setup management frame 1660 in accordance with the present disclosure. The threshold management frame 1660 includes a MAC header 1662 and a frame body 1664. The frame body 1664 includes a threshold setup field 1670 indicating the frame 1660 is a threshold setup management frame. The frame body 1664 also includes a reference CSI field 1675 and a sensing threshold timeout field 1680. The reference CSI field is variable and may have a Very High Throughput (VHT) compressed feedback format or a CSI matrix feedback format. The sensing threshold timeout field 1680 includes information indicating a time after which initiator may perform full channel measurement.

Figure 17:
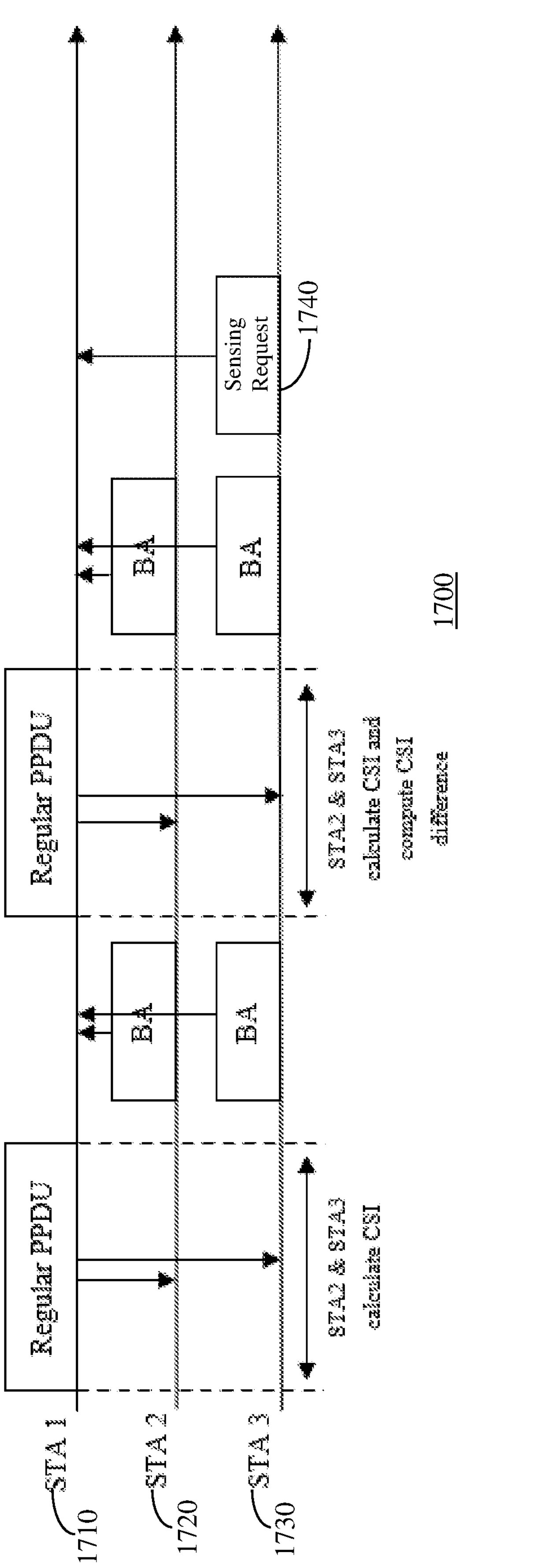
FIG. 17 is an illustration of channel measurement wherein a responder indicates threshold crossing by sending a sensing request frame to the initiator in accordance with the present disclosure.

FIG. 17 is an illustration 1700 of channel measurement wherein an initiator STA1 1710 communicates with responders STA2 1720 and STA3 1730, and wherein the responder STA3 1730 indicates threshold crossing in accordance with the present disclosure by sending a sensing request frame 1740 to the initiator STA1 1710. The sensing request frame 1740 may be transmitted by a STA when it has crossed threshold when the STA transmitting the sensing request frame is either an initiator itself or is a responder.

Figures 18, 19:
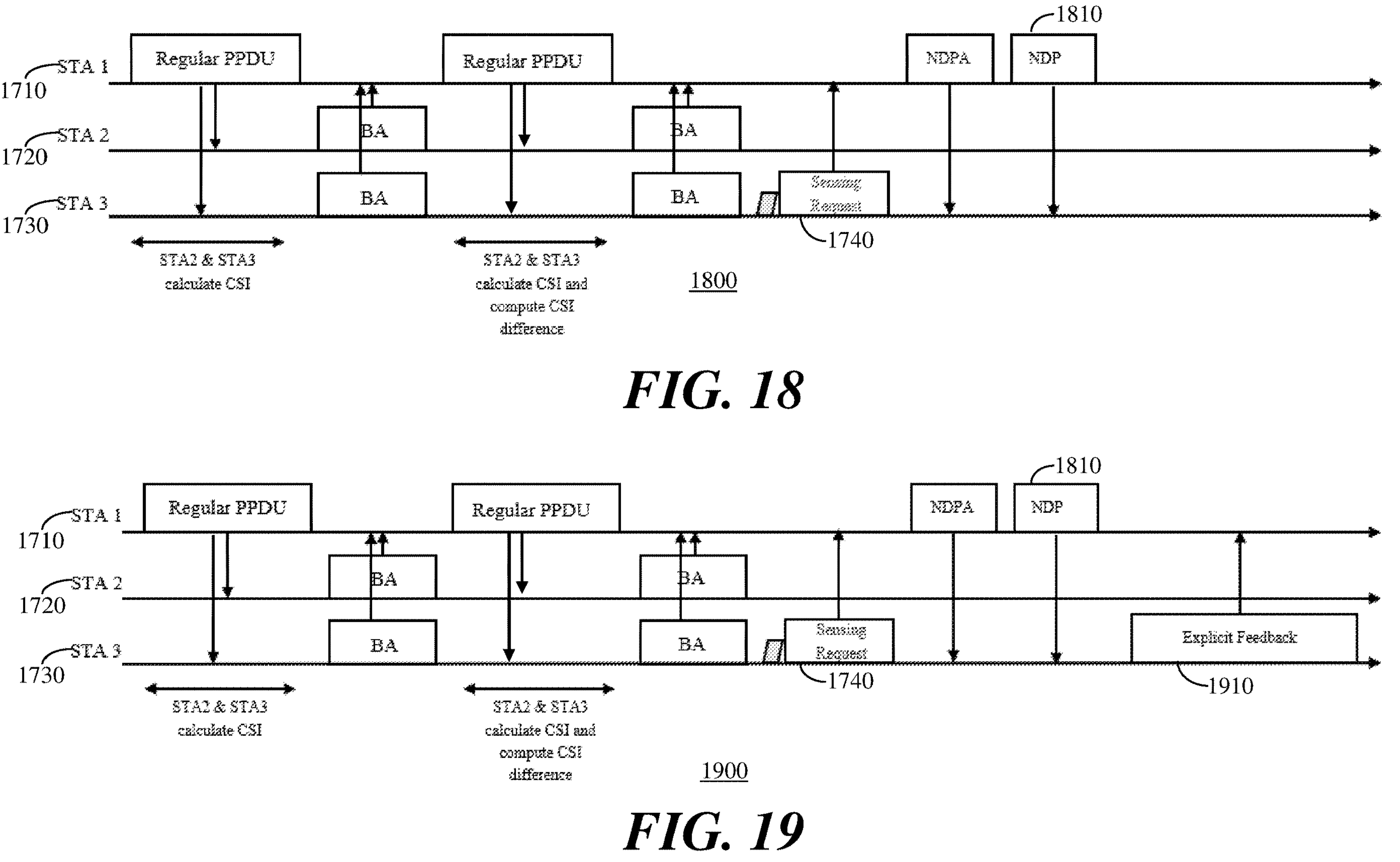
FIG. 18 is an illustration of a sensing procedure performed in response to a sensing request frame in accordance with the present disclosure.
FIG. 19 is an illustration of a sensing procedure performed in response to a sensing request frame sent by a responder in accordance with the present disclosure.

FIG. 18 is an illustration 1800 of a sensing procedure performed in response to a sensing request frame 1740 in accordance with the present disclosure. The STA upon crossing the threshold transmits the sensing request frame to another STA to solicit a NDP 1810 to perform full channel measurement. If the STA crossing the threshold (STA3 1730) is an initiator, the initiator STA can solicit the type of feedback required (e.g., NDP 1220, partial feedback 1330 or explicit feedback 1440), as discussed hereinabove. If the STA crossing the threshold (STA3 1730) is a responder, it may indicate threshold crossing to the initiator (STA1 1710) and may report back the measurement result to the initiator.

FIG. 19 is an illustration 1900 of a sensing procedure performed in response to the sensing request frame 1740 sent by a responder (STA3 1730) to an initiator (STA1 1710) in accordance with the present disclosure. In this case, STA3 1730, upon crossing the threshold, may contend for the channel and solicit the NDP 1810 from the initiator and report back the full channel measurement result to the initiator STA1 1710 in, for example, an explicit feedback 1910.

Figure 20:
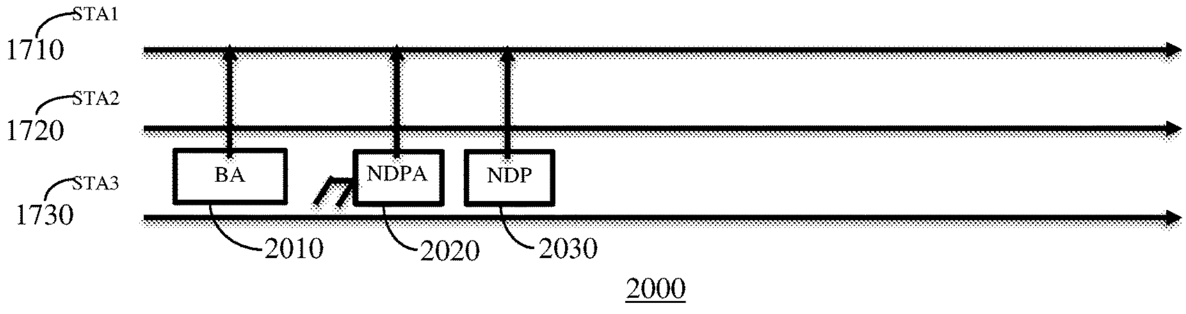
FIG. 20 is an illustration of a sensing procedure where a responder indicates threshold crossing and directly transmits a NDPA frame in accordance with the present disclosure.

FIG. 20 is an illustration 2000 of a sensing procedure where a responder (STA3 1730) indicates threshold crossing to an initiator (STA1 1710) in a Block Ack frame 2010 and directly transmits a NDPA frame 2020 and a NDP frame 2030 in accordance with the present disclosure. As the initiator STA1 1710 is a transmission opportunity period (TXOP) holder, the initiator STA 11710 may transmit other PPDUs which may cause a situation of possible collisions for a sensing measurement frame sent from STA3 1730. To mitigate this situation, STA3 1730 may perform channel contention and may transmit directly a sounding sequence to perform full channel measurement. In this scenario, a NDPA frame 1055 (FIG. 10B) may indicate 'no feedback' 1080 so that the STA1 1710 receiving this indication may transmit no feedback after performing channel measurement. While the sensing procedure of the illustration 2000 is fast, channel contention is needed by the STA3 1730 as a sensing transmitter.

Figure 21:
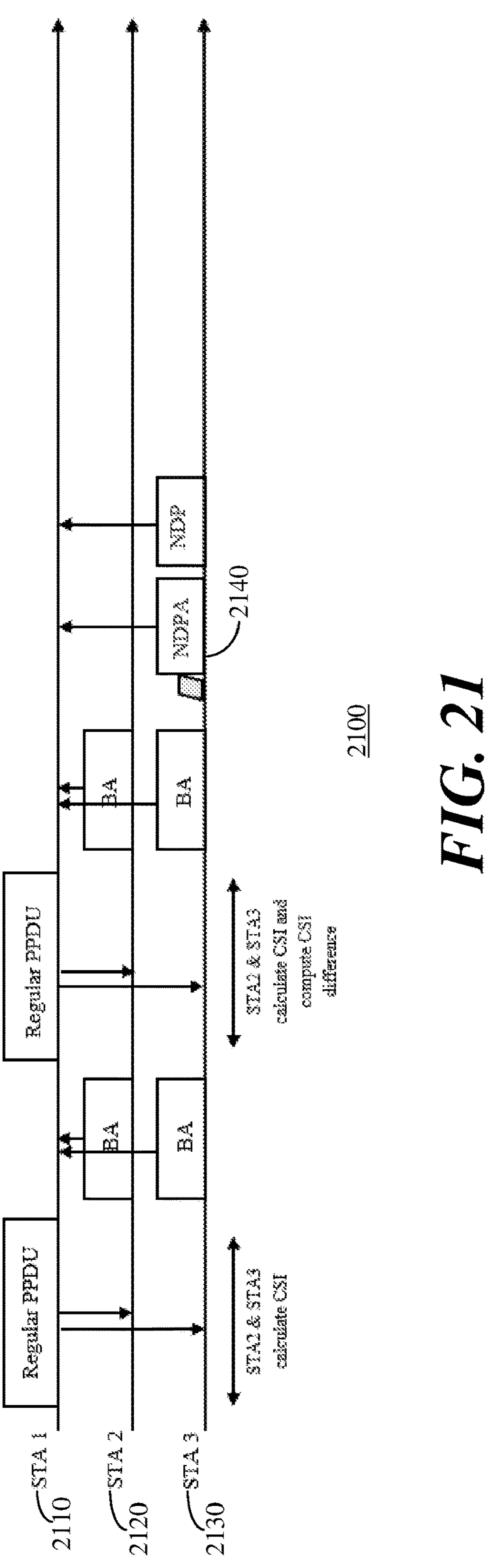
FIG. 21 is an illustration of a sensing procedure where a responder directly transmits a NDPA frame without first indicating threshold crossing in accordance with the present disclosure.

FIG. 21 is an illustration 2100 of a sensing procedure where a responder (STA3 2130) directly transmits a NDPA frame 2140 upon crossing the threshold without first indicating threshold crossing in accordance with the present disclosure. The responding STA3 2130 may perform channel contention to directly transmit sounding frames to the initiator STA1 2110 upon crossing the threshold without any indication. The STA1 2110 can then perform channel measurement and use the measurement result for the sensing applications.

Figure 22:
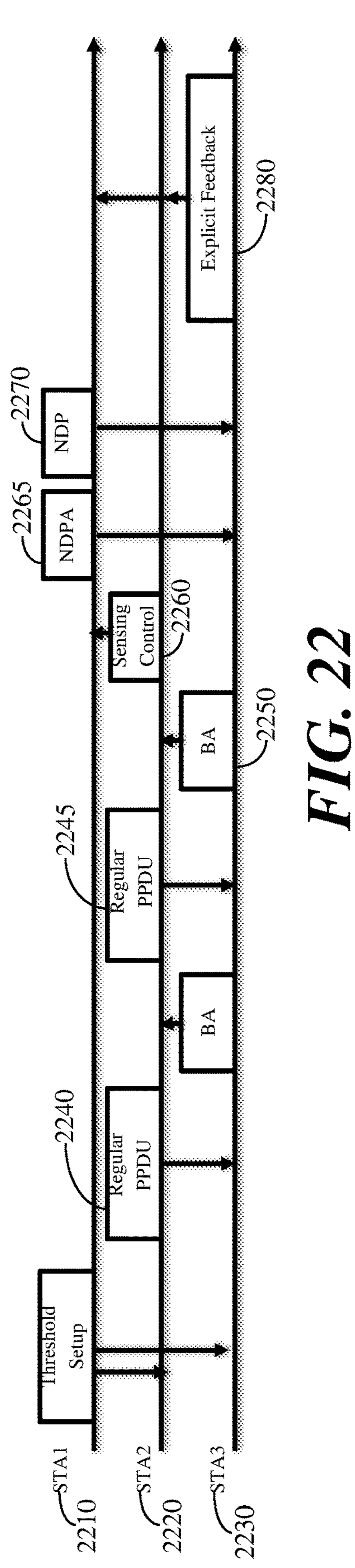
FIG. 22 is an illustration of a first collaborative sensing procedure where a sensing initiator is neither a sensing transmitter nor a sensing receiver in accordance with the present disclosure.

Referring to FIG. 22, an illustration 2200 depicts a first collaborative sensing procedure where a sensing initiator (STA1 2210) is neither a sensing transmitter nor a sensing receiver in accordance with the present disclosure. STA2 2220 is the sensing transmitter and STA3 2230 is the sensing responder and the sensing receiver. The STA2 2220 and the STA3 2230 perform WLAN sensing and the STA3 2230 performs channel measurement based on PPDUs 2240, 2245 from the STA2 2220. Upon crossing the threshold, the STA3 2230 indicates this to the STA2 2220 with a Block Ack frame 2250. Upon receiving the Block Ack frame 2250, the STA2 2220 transmits a sensing control frame 2260 to the STA1 2210 to inform the STA1 2210 about the beginning of a sensing procedure to be performed by the STA3 2230. The STA1 2210 then transmits a NDPA frame 2265 and a NDP frame 2270 to the STA3 2230 and the STA3 2230, upon performing full channel measurement, transmits the result back to STA2 2220 which in turn transmits the result to the initiator (STA1 2210) as explicit feedback 2280. A STA not participating in regular communication may perform WLAN sensing and this collaborative sensing procedure is helpful in a centralized system where a central entity manages the sensing application.

Figure 23:
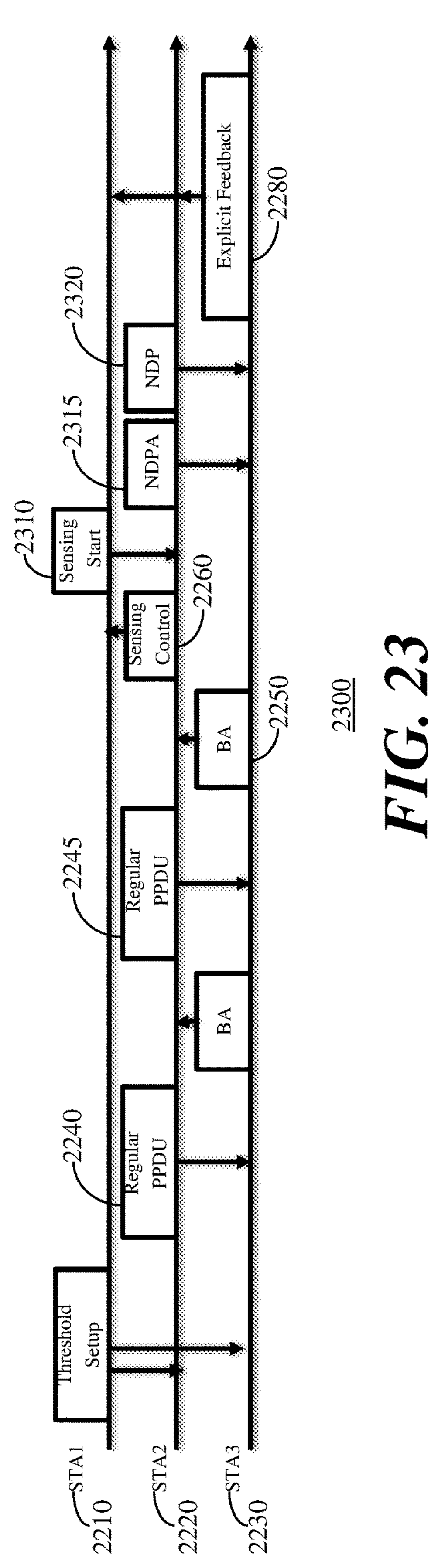
FIG. 23 is an illustration of a second collaborative sensing procedure where a sensing initiator is neither a sensing transmitter nor a sensing receiver in accordance with the present disclosure.

FIG. 23 is an illustration 2300 of a second collaborative sensing procedure where the sensing initiator STA1 2210 is neither a sensing transmitter nor a sensing receiver in accordance with the present disclosure. This collaborative sensing procedure operates the same as the collaborative sensing procedure of illustration 220 until after the STA2 2220 transmits the sensing control frame 2260 to the STA1

2210. Thereafter, the STA1 2210 transmits a 'sensing start' frame 2310 to the STA2 2220 to ask the STA2 2220 to perform full channel measurement. The STA2 2220 then transmits a NDPA frame 2315 and a NDP frame 2320 to the STA3 2230 and the STA3 2230, upon performing full channel measurement, transmits the result back to STA2 2220 which in turn transmits the result to the initiator (STA1 2210) as explicit feedback 2280.

Figures 24A, 24B:
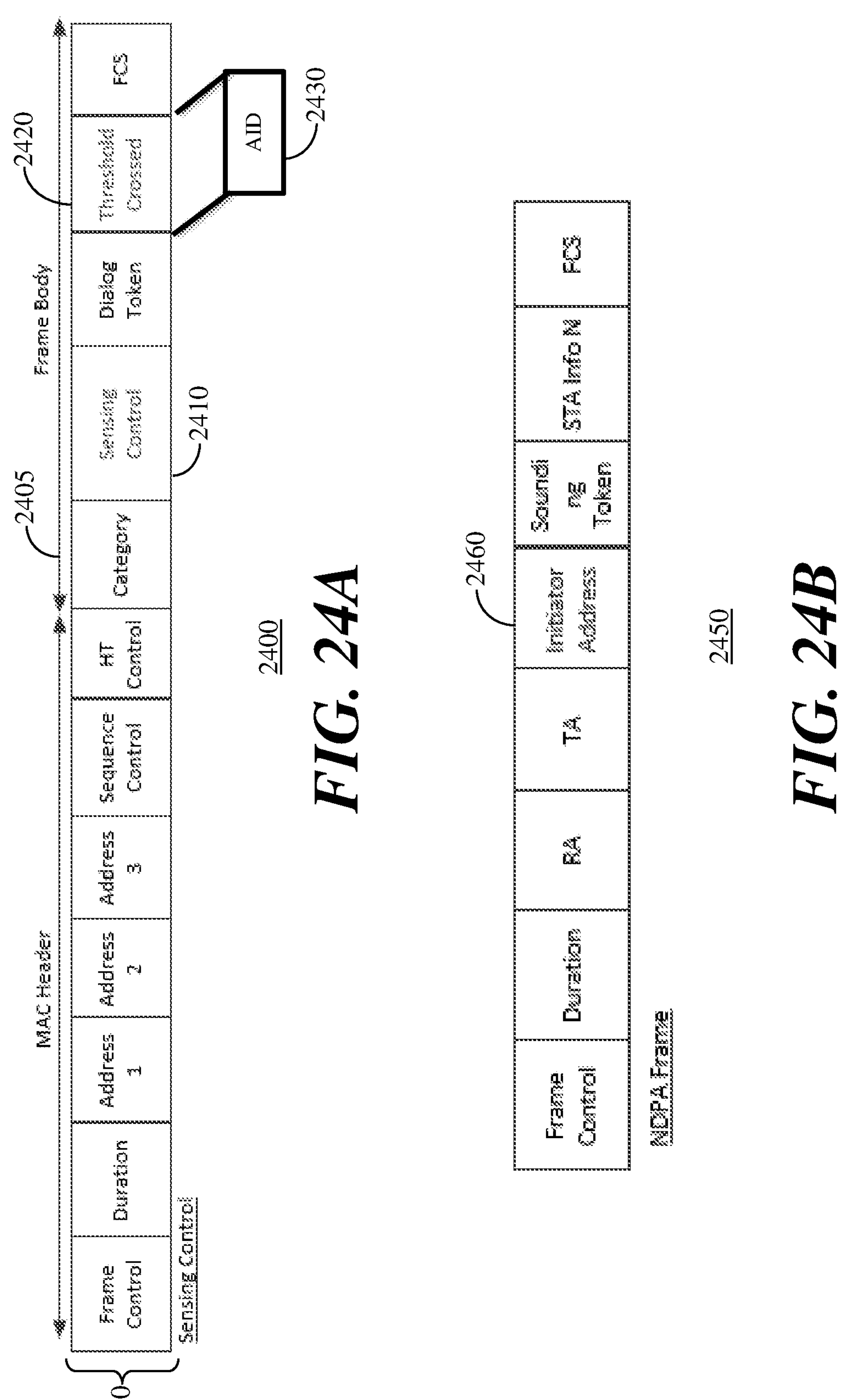

FIG. 24A depicts a diagram 2400 of the sensing control frame 2260 transmitted to the initiator STA1 2210 when a STA crosses the threshold in accordance with the present disclosure. A sensing control frame 2410 and a threshold crossed field 2420 in the frame body 2405 indicate to the initiator STA1 2210 that the sensing procedure about to begin. An association ID (AID) 2430 indicates the STA which is about to perform the sensing procedure.

FIG. 24B depicts a diagram 2450 of the NDPA frame 2265, 2315 in accordance with the present disclosure. As an alternative to the two-part transmission of the explicit feedback depicted in the illustration 2200 (FIG. 22) and the illustration 2300 (FIG. 23) and described hereinabove, the NDPA frame may indicate an initiator address 2460 to which the explicit feedback 2280 will be transmitted (e.g., the address of the initiator STA1 2210).

Figure 25:
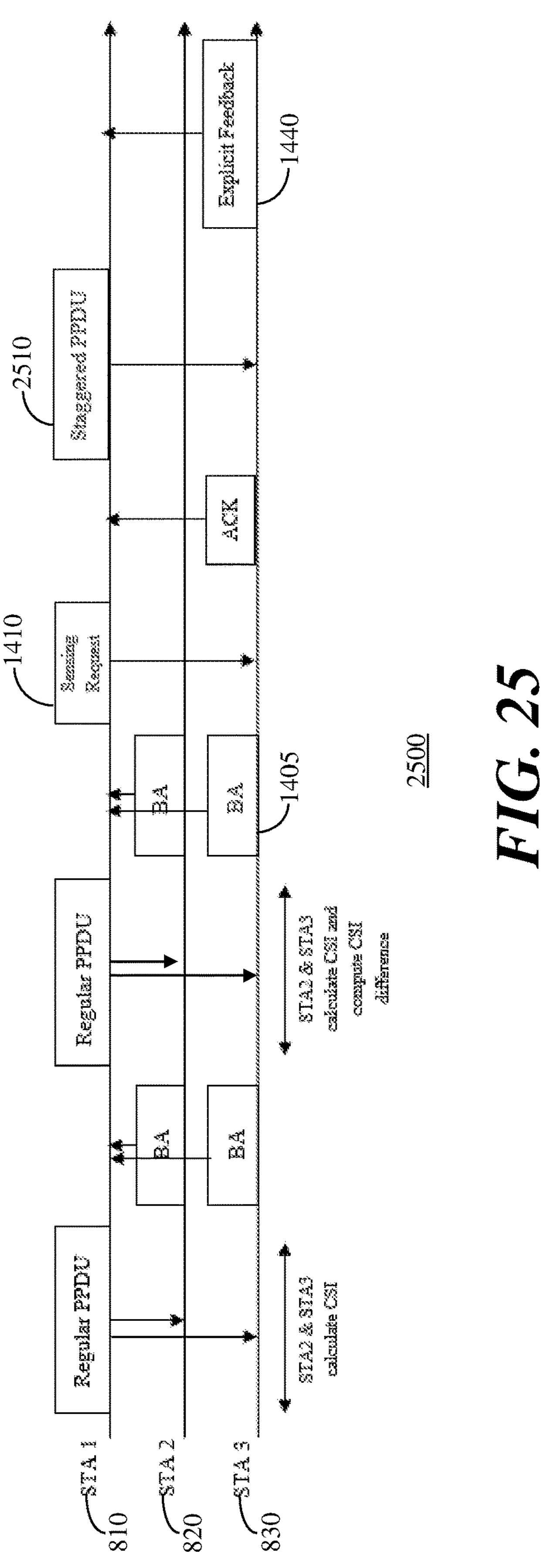
FIG. 25 is an illustration of a sensing procedure utilizing staggered PPDUs to solicit feedback in accordance with the present disclosure.

FIG. 25 is an illustration 2500 of a sensing procedure utilizing staggered PPDUs to solicit feedback in accordance with the present disclosure. Additional signaling is required for the responding STA (STA3 830) to know about a staggered sounding PPDU 2510. The STA3 830, upon crossing the threshold, indicates threshold crossing to the STA1 810 in a Block Ack 1405. The STA1 810 transmits the sensing request 1410 to the STA3 830 indicating Explicit Feedback. The STA1 810, in subsequent transmissions transmits a staggered sounding PPDU 2510 (i.e., a PPDU with extra-LTFs) for full channel sounding. The STA3 830 upon receiving the staggered sounding PPDU 2510 transmits the Explicit Feedback 1440 to the STA1 810. Using the Staggered PPDU 2510 for full channel measurement may help eliminate a NDP sounding sequence and help in full channel measurement along with data communication.

Figure 26:
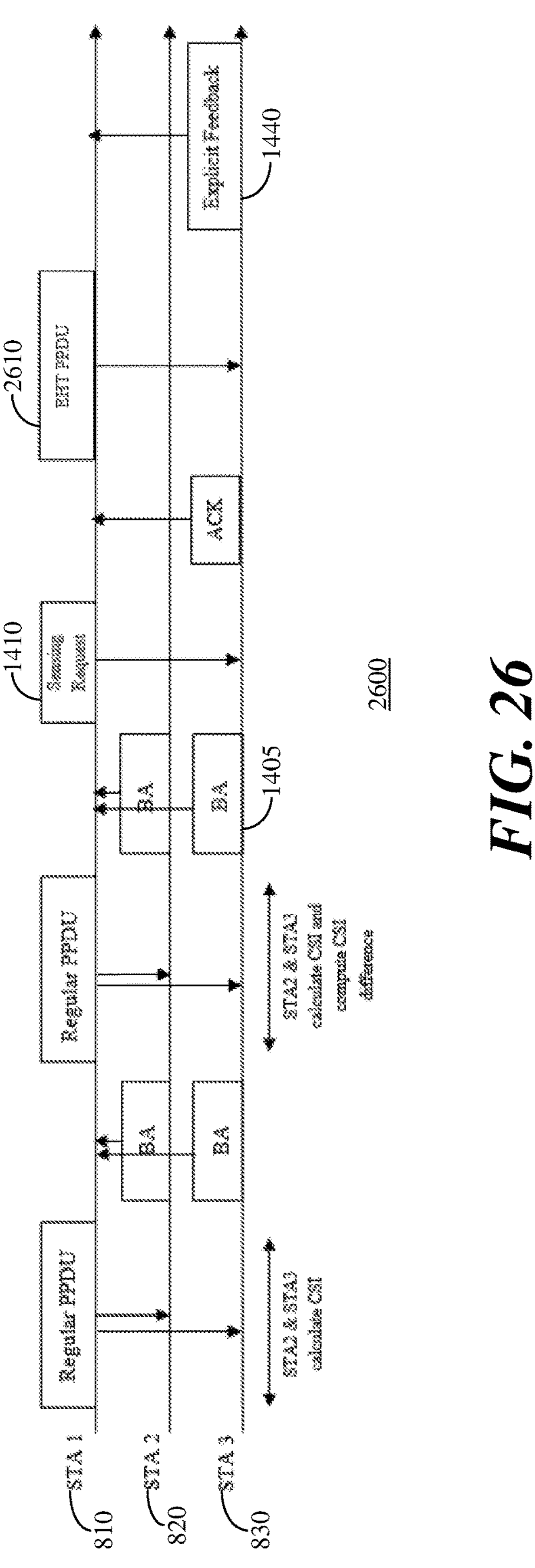
FIG. 26 is an illustration of a sensing procedure utilizing an extra high throughput (EHT) PPDU to solicit feedback in accordance with the present disclosure.
Figures 27A, 27B:
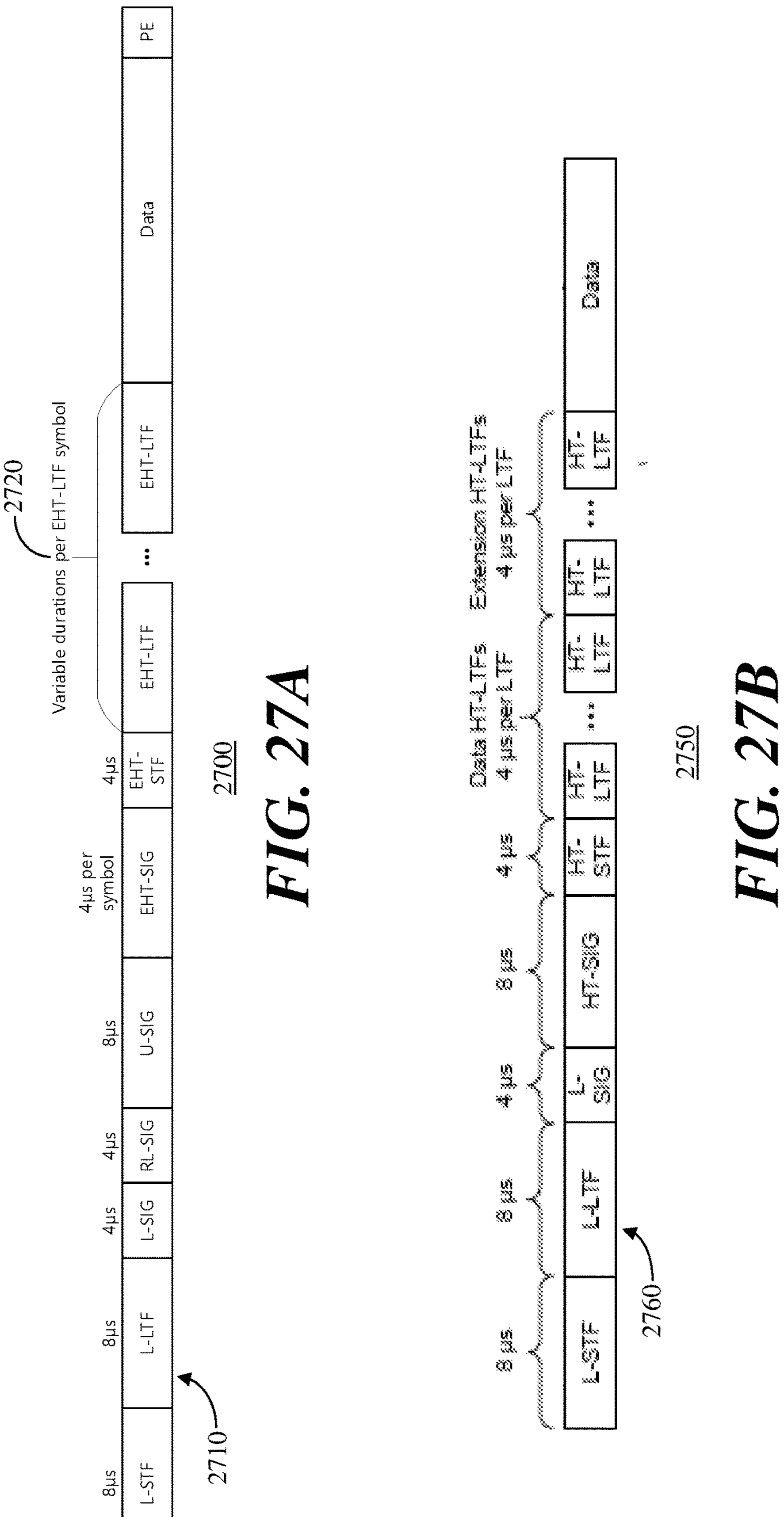

FIG. 26 is an illustration 2600 of a sensing procedure similar to the sensing procedure of the illustration 2550 which utilizes an extra high throughput (EHT) PPDU 2610 instead of a staggered PPDU 2510 to solicit feedback in accordance with the present disclosure;

FIG. 27A is a diagram 2700 of an 802.11be EHT PPDU 2710 used as the EHT PPDU 2610 in the sensing procedure of the illustration 2600 in accordance with the present disclosure. 802.11be defines the EHT PPDU 2710 as having a number of EHT-LTF 2720 which can be independent from the number of STS—this can be helpful to estimate the complete channel. FIG. 27B is a diagram 2750 of a high throughput (HT) PPDU 2760 which can alternatively be used as the EHT PPDU 2610 in the sensing procedure of the illustration 2600 in accordance with the present disclosure.

Figure 28:
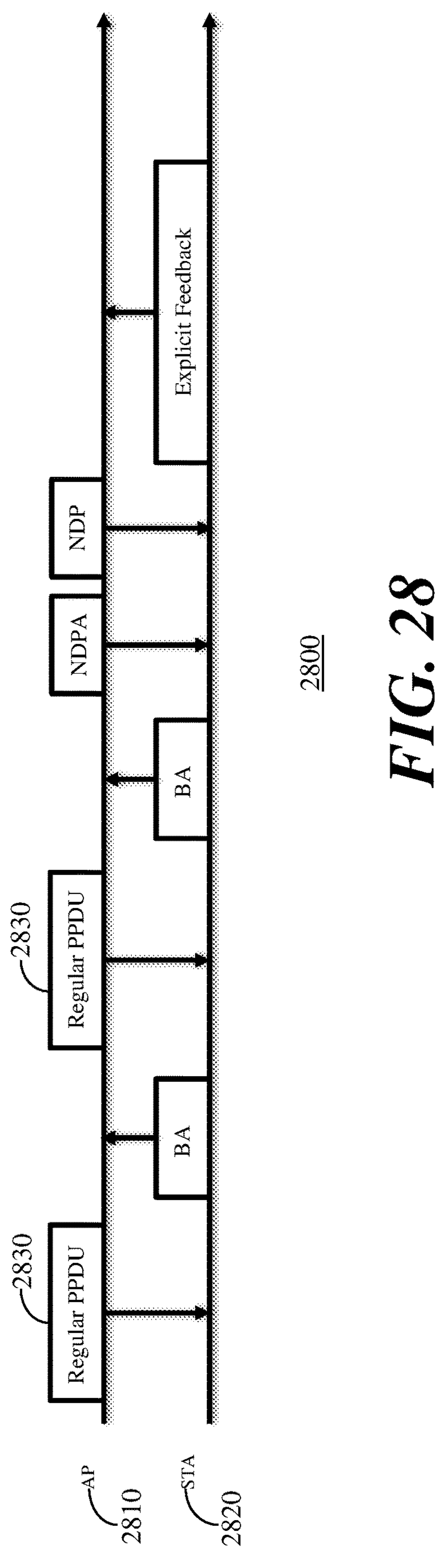
FIG. 28 is an illustration of a beamforming procedure using the sensing procedure in accordance with the present disclosure.

FIG. 28 is an illustration 2800 of a beamforming procedure using the sensing procedure in accordance with the present disclosure with an access point AP 2810 and a wireless station STA 2820. The channel measurement using regular PPDUs 2830 in accordance with the present disclosure can also trigger a beamforming procedure. The AP 2810 can measure the uplink channel and the STA 2820 can measure the downlink channel. Based on a difference in LTF, a beamforming procedure may be initiated by the AP 2810.

Referring back to the illustration 100 (FIG. 1), the steps involved in threshold-based WLAN sensing are hereinafter explained. Each AP 110 calculates a threshold for STA(s) 120 associated therewith (i.e., within the associated area of service 115). The AP 110 may make the STA 120 aware of the threshold value using a beacon frame or a unicast management frame. Once the threshold has been set on the STA(s) 120, the STA 120 performs a channel measurement during regular communication and checks for threshold crossing. In the illustration 100, the AP4 110*d* and the STA4 120*d* will detect a change in channel due to presence of the person 135. Therefore, the STA4 120*d* threshold will be crossed based on the specified sensing roles of the AP4 110*d* and the STA4 120*d*. Then, full channel measurement may be performed for the AP4 110*d* and the STA4 120*d* and the results may be transmitted to the initiator (AP 110/STA 120/Server 130).

Figures 29, 30:
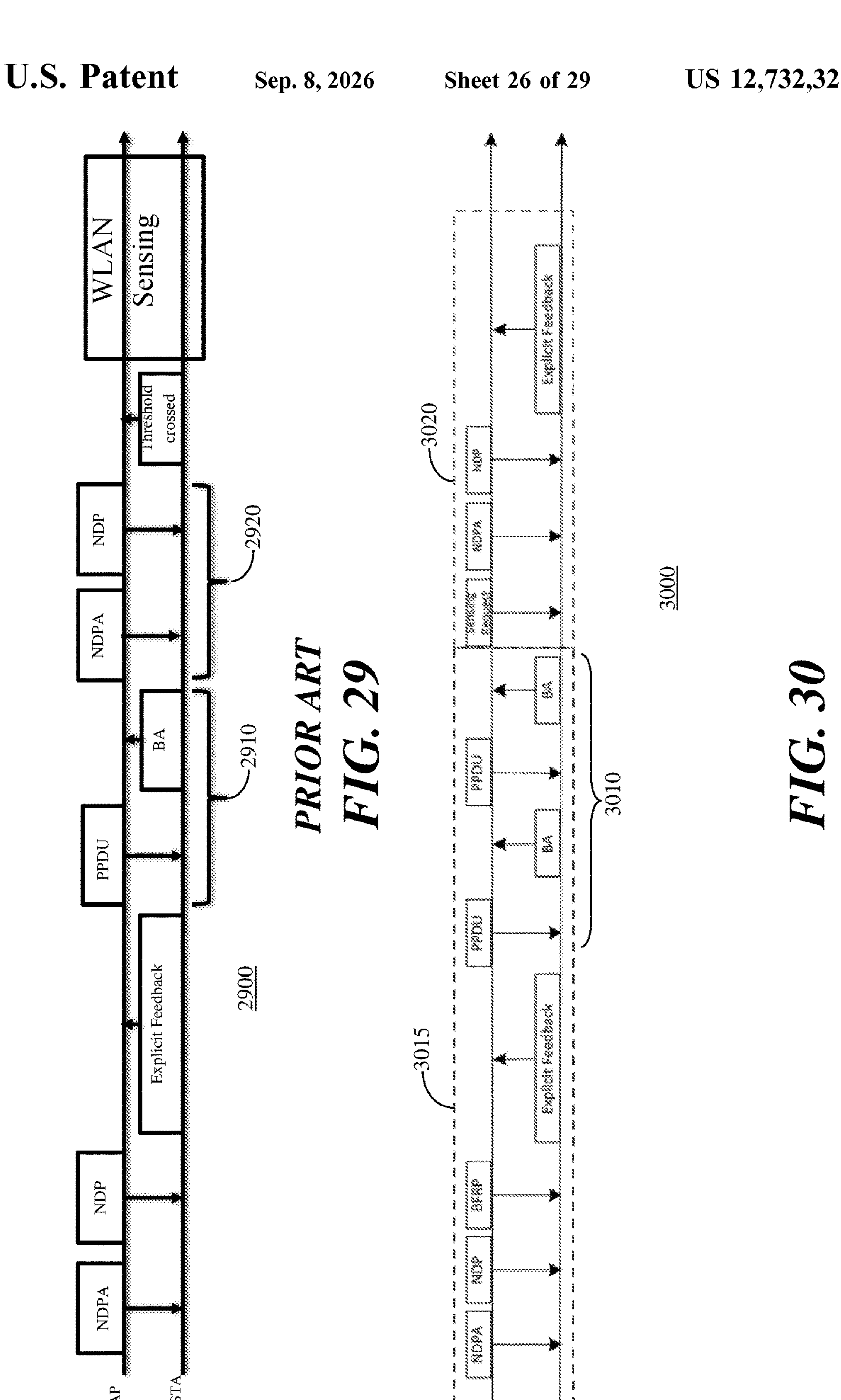
FIG. 29 is an illustration of conventional WLAN sensing.
FIG. 30 is an illustration of WLAN sensing in accordance with the present disclosure.

FIG. 29 is an illustration 2900 of conventional WLAN sensing. Unlike WLAN sensing in accordance with the present disclosure, no channel measurement is performed during a portion 2910 of the conventional communication and overhead 2920 for checking threshold disadvantageously interrupts regular communication.

FIG. 30 is an illustration 3000 of WLAN sensing in accordance with the present disclosure. Using threshold-based WLAN sensing in accordance with the present disclosure advantageously performs a channel measurement 3010 with regular PPDUs during regular communication 3015, reducing the overhead of full channel sounding sequences for channel measurement without cutting down regular communication time. Full channel measurement is performed only when the threshold is crossed, advantageously saving unnecessary sounding-related frame exchanges and cutting down overhead. When threshold crossing is detected, WLAN sensing 3020 is performed in accordance with the present disclosure.

Figure 31:
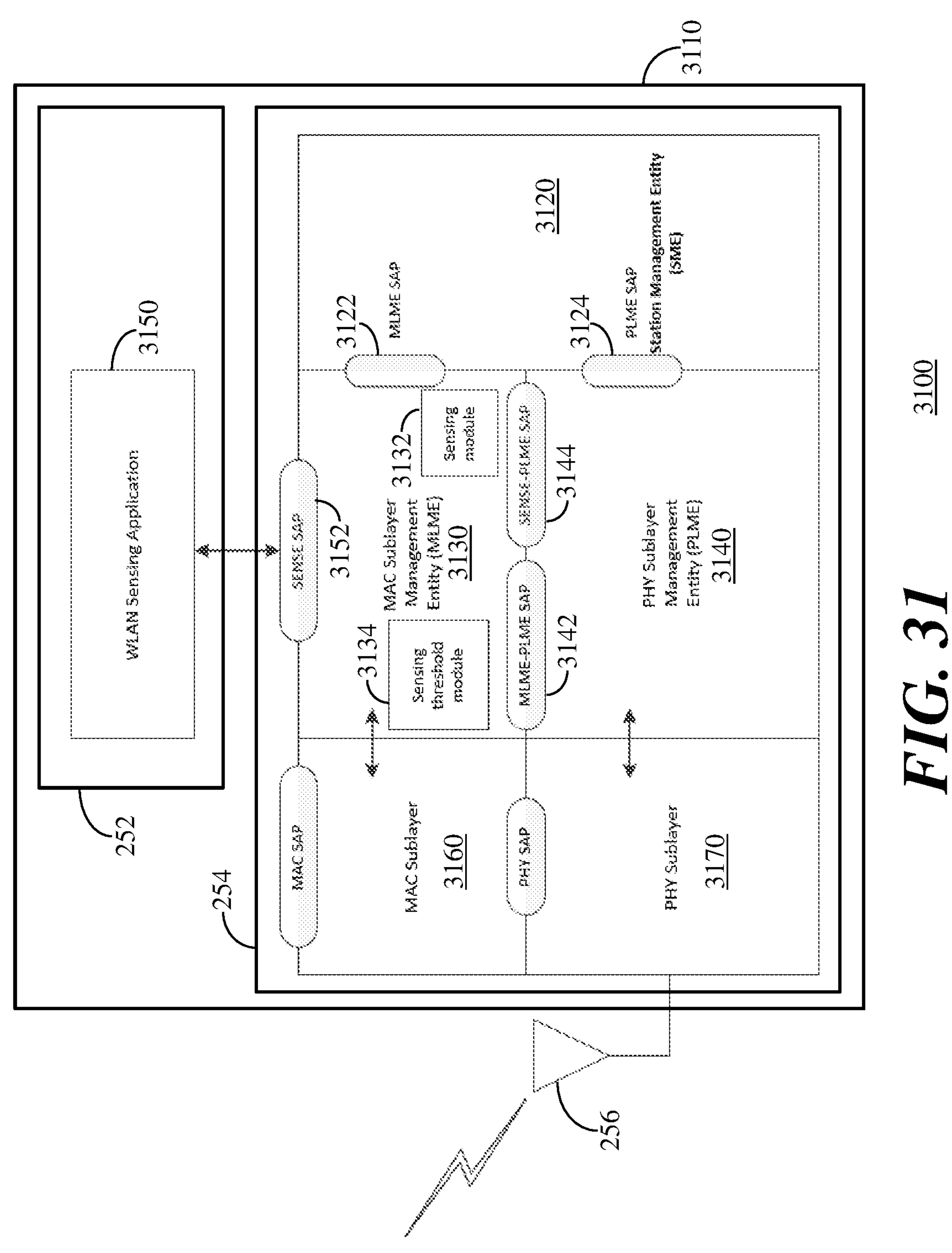
FIG. 31 is a block diagram of a WLAN sensing apparatus in accordance with the present disclosure.

FIG. 31 is a block diagram 3100 of a WLAN sensing apparatus 3110 in accordance with the present disclosure. As discussed hereinabove, the WLAN sensing apparatus 3110 may be an access point (AP) 110 (FIG. 1) including a controller 252, transceiver circuitry 254 and an antenna 256 (FIG. 2B), or may be a wireless station (STA) 120 including a controller 202, transceiver circuitry 204 and an antenna 206 (FIG. 2A). For simplicity, the WLAN sensing apparatus 3110 is an AP 110 which may be an initiator or a responder in accordance with the present disclosure, however the skilled person will realize that the WLAN portions of the transceiver circuitry 254 and the controller 256 will be similarly present in the transceiver circuitry 204 and the controller 206 of a STA 120.

Within the transceiver circuitry 254, a station management entity (SME) 3120 manages a MAC sublayer management entity (MLME) 3130 through a MLME service access point (MLME SAP) 3122 and manages a PHY sublayer management entity (PLME) 3140 through a PLME service access point (PLME SAP) 3124. In accordance with the present disclosure, the MLME 3130 communicates with a WLAN sensing application 3150 in the controller 252 via a Sense service access point (SENSE SAP) 3152. The MLME 3130 performs WLAN sensing in accordance with the present disclosure in a sensing module 3132 and, when acting as an initiator, calculates threshold for associated STAs 110 in a sensing threshold module 3134. The MLME 3130 communicates with the PLME 3140 for regular communication via a MLME-PLME SAP 3142 and communicates with the PLME 3140 for WLAN sensing in accordance with the present disclosure via a SENSE-PLME SAP 3144. The MAC Sublayer 3160 and the PHY Sublayer 3170 are encoded or decoded under management of the MLME 3130 and the PLME 3140, respectively, for transmitting from or receiving by the WLAN sensing apparatus 3110 in a manner known to those skilled in the art.

Figure 32:
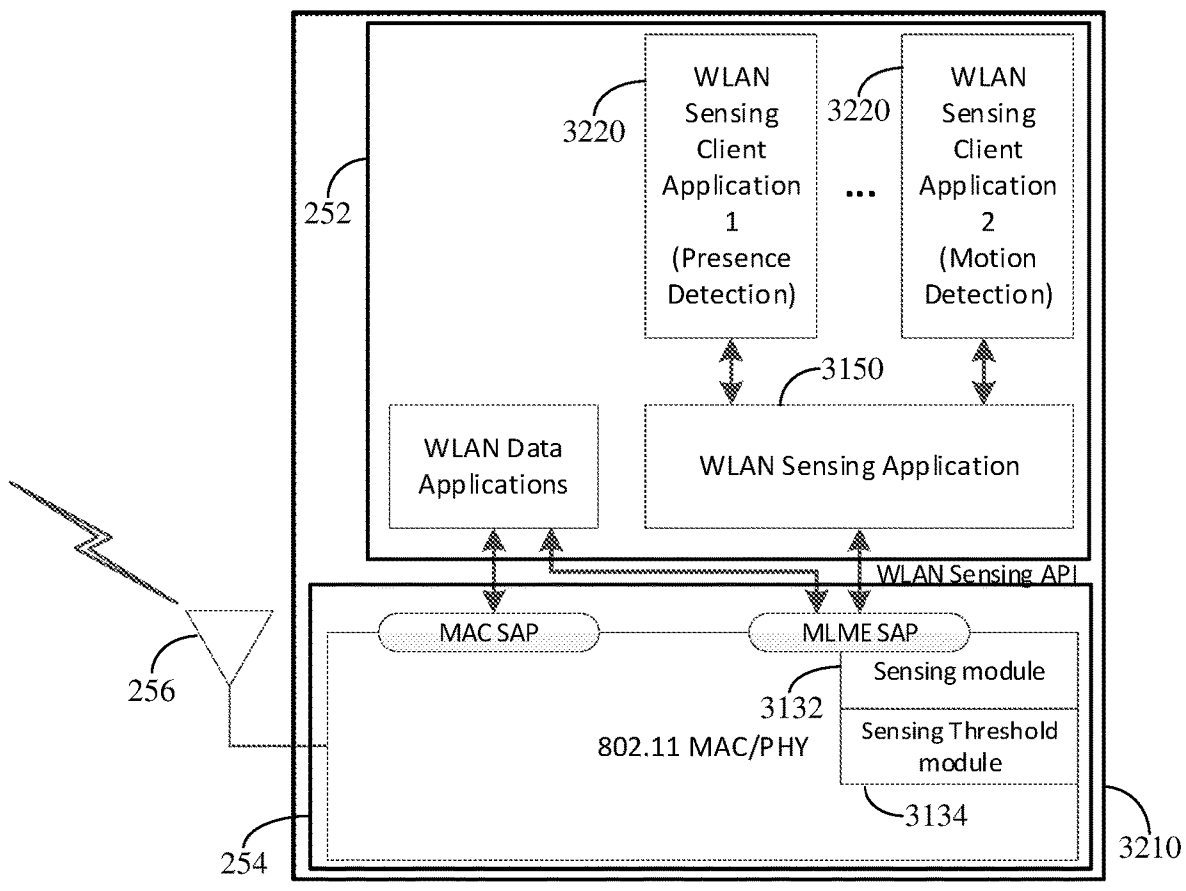
FIG. 32 is a block diagram of a single device implementation of a WLAN sensing system in accordance with the present disclosure.

For simple use cases/deployments, the entire WLAN Sensing platform may be implemented on a single device. FIG. 32 depicts a block diagram 3200 of a WLAN sensing system implemented in a single device 3210 in accordance with the present disclosure. Within the controller 252, multiple WLAN sensing client applications 3220 perform WLAN Sensing based on the channel measurements (e.g., using, for example, application specific machine learning algorithms) and provides the results of the WLAN Sensing (e.g., Presence/Absence, Human Motion) to a WLAN Sensing Application, such as the WLAN Sensing Application 3150 (FIG. 31). The WLAN Sensing Application 3150 collects and consolidates the channel measurement results from 802.11 devices. The WLAN Sensing Application 3150 may process the results (e.g., by smoothing or by compression) before passing the processed results to the WLAN sensing client applications 3220. In the transceiver 254, the sensing module 3132 performs channel measurements and provides the raw results to the WLAN Sensing Application 3150. The sensing threshold module 3134 performs threshold calculations and provides the threshold values to the WLAN Sensing MAC to be set for the STA(s).

Figure 33:
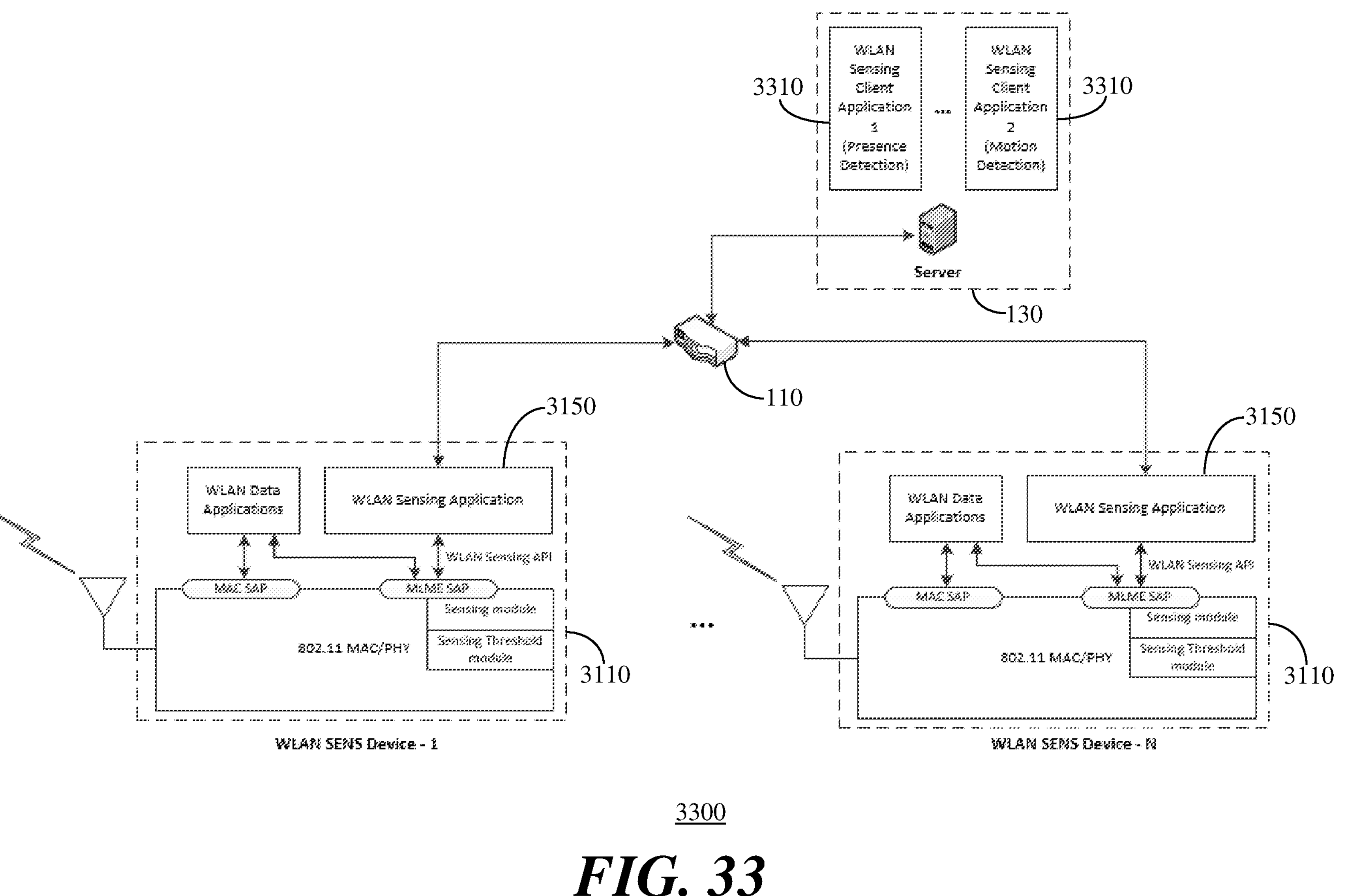
FIG. 33 is a block diagram of a centralized, multiple device implementation of a WLAN sensing system in accordance with the present disclosure.

Referring to FIG. 33, a block diagram 3300 depicts a centralized, multiple device implementation of a WLAN sensing system in accordance with the present disclosure. The centralized WLAN sensing system includes the server 130 (FIG. 1) which communicates with the WLAN sensing apparatuses 3110 (e.g., STAs 120) via an access point 110. The server 130 hosts WLAN Sensing Client Applications 3310 allowing more advanced WLAN sensing algorithms to be utilized. In addition, in the centralized WLAN sensing system, the server 130 may perform threshold calculations for associated AP(s).

In the WLAN sensing apparatuses 3110 of the centralized WLAN sensing system, the WLAN Sensing Applications 3150 may require more advanced processing of the channel measurement results (e.g., smoothing or compression) to reduce the traffic load on the network infrastructure. To accommodate this the WLAN sensing apparatuses 3110 may have a threshold computation subsystem.

Thus, it can be seen that the exemplary embodiments in accordance with the present disclosure provide multiple structures and methods to enable threshold-based methods to perform WLAN sensing using regular PPDUs. While conventional WLAN sensing proposes a threshold-based method to perform WLAN sensing in which a NDP frame is transmitted to check whether the threshold has been crossed resulting in overhead to data communication due to the scheduled transmission of the NDP which hinders ongoing data communication, WLAN sensing in accordance with the present disclosure reduces the overhead on data communication as full channel measurement will only be performed once the threshold is crossed, therefore requiring no transmission of a NDP before a threshold has been crossed.

The present disclosure can be realized by software, hardware, or software in cooperation with hardware. Each functional block used in the description of each embodiment described above can be partly or entirely realized by a large-scale integration (LSI) such as an integrated circuit, and each process described in each embodiment may be controlled partly or entirely by the same LSI or a combination of LSIs. The LSI may be individually formed as integrated circuit chips, or one chip may be formed so as to include a part or all of the functional blocks. The LSI may include a data input and output coupled thereto. The LSI may be referred to as an integrated circuit (IC), a system LSI, a super LSI, or an ultra-LSI depending on a difference in the degree of integration. However, the technique of implementing an integrated circuit is not limited to the LSI and may be realized by using a dedicated circuit, a general-purpose processor, or a special purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. He present disclosure can be realized as digital processing or analogue processing. If future integrate circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or -function as a receiver and a transmitter. The transceiver, as the transmitter and receiver, may include a radio frequency (RF) module including amplifiers, RF modulators/demodulators and the like, and one or more amplifiers, RF modulators/demodulators and the like, and one or more antennas. The processing/control circuitry may include power management circuitry which may comprise dedicated circuitry, a processor and instructions for power management control as either firmware or instructions stored in a memory coupled to the processor.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (e.g., digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus may also include an infrastructure facility, such an access point, and any other apparatus, device or system that communicates with or controls apparatuses such as those in the non-limiting examples provided herein.

While exemplary embodiments have been presented in the foregoing detailed description of the disclosure, it should be appreciated that a vast number of variations exist. It should further be appreciated that the exemplary embodiments are only examples, and are not intended to limit the scope, applicability, operation, or configuration of the present disclosure in any way. Rather, the foregoing detailed description will provide those skilled in the art with a convenient road map for implementing exemplary embodiments, it being understood that various changes may be made in the function and arrangement of the STA communication apparatus and/or the AP communication apparatus described in the exemplary embodiments without departing from the scope of the present disclosure as set forth in the appended claims.

Example 1. A communication apparatus comprising:

a transceiver, which in operation, receives signals in a wireless local area network (WLAN); and circuitry, which in operation, demodulates and decodes the signals, the decoded signals comprising a first physical layer protocol data unit (PPDU) and a second PPDU, wherein the circuitry, in operation, performs full channel measurement based on a first physical layer (PHY) header of the first PPDU and a second PHY header of the second PPDU, wherein the first PHY header and the second PHY header include long training fields (LTFs) for estimating channel quality.

Example 2. The communication apparatus in accordance with Example 1 wherein the second PPDU is received by the transceiver subsequent to the first PPDU.

Example 3. The communication apparatus in accordance with Example 2 wherein the circuitry, in operation, performs full channel measurement based on a difference between the first PPDU and the second PPDU.

Example 4. The communication apparatus in accordance with Example 1 or Example 2 wherein the circuitry, in operation, calculates a first channel measurement parameter based on the first PPDU and calculates a second channel measurement parameter based on the second PPDU.

Example 5. The communication apparatus in accordance with Example 4 wherein the circuitry, in operation, performs full channel measurement based on a difference between the first channel measurement parameter and the second channel measurement parameter.

Example 6. The communication apparatus in accordance with Example 4 or Example 5 wherein the first channel measurement parameter comprises first channel state information, and wherein the second channel measurement parameter comprises second channel state information.

Example 7. The communication apparatus in accordance with Example 4 or Example 5 wherein the first channel measurement parameter and the second channel measurement parameter comprise one of time reversal resonating strength (TRRS), signal-to-noise ratio (SNR) or detected channel energy.

Example 8. The communication apparatus in accordance with any of Examples 5 to 7 wherein the circuitry, in operation, performs full channel measurement based on the difference between the first channel measurement parameter and the second channel measurement parameter exceeding a threshold value.

Example 9. The communication apparatus in accordance with Example 8 wherein the circuitry, in operation, generates an indication of threshold crossing based on the difference between the first channel measurement parameter and the second channel measurement parameter exceeding the threshold value, and wherein the transceiver, in operation, transmits the indication of threshold crossing in an uplink frame.

Example 10. The communication apparatus in accordance with Example 9 wherein the uplink frame comprises one of a Block Ack frame, a sounding frame or a unicast action frame.

Example 11. The communication apparatus in accordance with any of Examples 8 to 10 wherein the transceiver, in operation, receives a threshold value signal in one of a beacon frame, a unicast management frame or a probe response frame, and wherein the circuitry, in operation, demodulates and decodes the threshold value signal to derive the threshold value.

Example 12. The communication apparatus in accordance with any of the preceding examples wherein the circuitry, in operation, initiates a beamforming procedure based on the first PHY header of the first PPDU and the second PHY header of the second PPDU.

Example 13. A communication apparatus comprising:

a transceiver, which in operation, receives signals in a wireless local area network (WLAN); and circuitry, which in operation, demodulates and decodes the signals, the decoded signals comprising an indication of threshold crossing by an associated communication apparatus, wherein the circuitry, in operation, initiates a WLAN sensing procedure to perform full channel measurement based on the indication of threshold crossing by the associated communication apparatus.

Example 14. The communication apparatus in accordance with Example 13 wherein the communication apparatus functions as a WLAN sensing initiator, and wherein the associated communication apparatus functions as a WLAN sensing responder.

Example 15. The communication apparatus in accordance with Example 13 or Example 14 wherein the indication of threshold crossing by the associated communication apparatus is received in a Block Ack frame.

Example 16. The communication apparatus in accordance with any of Examples 13 to 15 wherein the decoded signals comprise a physical layer protocol data unit (PPDU), and wherein the circuitry, in operation, initiates the WLAN sensing procedure to perform full channel measurement based on the PPDU indicating threshold crossing by the associated communication apparatus.

Example 17. The communication apparatus in accordance with any of Examples 13 to 16 wherein the circuitry, in operation, initiates the WLAN sensing procedure by generating a sensing request frame including a WLAN sensing request, and wherein the transceiver transmits the sensing request frame to the associated communication apparatus.

Example 18. The communication apparatus in accordance with Example 17 wherein the sensing request frame solicits feedback from the associated communication apparatus.

Example 19. The communication apparatus in accordance with Example 18 wherein the solicited feedback includes one of a null data packet (NDP), a partial feedback or an explicit feedback.

Example 20. The communication apparatus in accordance with Example 19 wherein the circuitry, in operation, performs the full channel measurement based on the solicited feedback including a NDP.

Example 21. The communication apparatus in accordance with Example 19 wherein the circuitry, in operation, generates a NDP for transmission to the associated communication apparatus to perform full channel measurement and provide explicit channel measurement feedback based on the solicited feedback including an explicit feedback.

Example 22. The communication apparatus in accordance with Example 21 wherein the circuitry, in operation, further generates a staggered PPDU including extra long training fields (LTFs) for transmission to the associated communication apparatus to provide the explicit channel measurement feedback.

Example 23. The communication apparatus in accordance with Example 19 wherein the decoded signals comprise channel quality information of a long training field (LTF) included in a PPDU received by the associated communication apparatus based on the solicited feedback including a partial feedback.

Example 24. A communication method in a wireless local area network (WLAN) comprising performing full channel measurement in response to a first physical layer (PHY) header of first physical layer protocol data unit (PPDU) and a second PHY header of a second PPDU, the first PHY header and the second PHY header include long training fields (LTFs) for estimating channel quality, wherein the second PPDU is received subsequent to the first PPDU, and wherein performing the full channel measurement is based on a difference between the first PPDU and the second PPDU.

Example 25. The communication method in accordance with Example 24 further comprising:

calculating a first channel measurement parameter based on the first PPDU; and calculating a second channel measurement parameter based on the second PPDU, wherein performing the full channel measurement is based on a difference between the first channel measurement parameter and the second channel measurement parameter.

Example 26. The communication method in accordance with Example 25 wherein the first channel measurement parameter comprises first channel state information, and wherein the second channel measurement parameter comprises second channel state information.

Example 27. The communication method in accordance with Example 25 or Example 26 wherein the first channel measurement parameter and the second channel measurement parameter comprise one of time reversal resonating strength (TRRS), signal-to-noise ratio (SNR) or detected channel energy.

Example 28. The communication method in accordance with any of Examples 25 to 27 wherein performing the full channel measurement comprises performing the full channel measurement based on the difference between the first channel measurement parameter and the second channel measurement parameter exceeding a threshold value.

Example 29. The communication method in accordance with Example 28 transmitting an indication of threshold crossing in an uplink frame based on the difference between the first channel measurement parameter and the second channel measurement parameter exceeding the threshold value.

Example 30. The communication method in accordance with Example 29 wherein the uplink frame comprises one of a Block Ack frame, a sounding frame or a unicast action frame.

Example 31. The communication method in accordance with any of Examples 28 to 30 further comprising receiving the threshold value in one of a beacon frame, a unicast management frame or a probe response frame.

Example 32. The communication method in accordance with any of Examples 24 to 30 further comprising initiating a beamforming procedure based on the first PHY header of the first PPDU and the second PHY header of the second PPDU.

Example 33. A communication method in a wireless local area network (WLAN) comprising:

receiving an indication of threshold crossing by an associated communication apparatus; and initiating a WLAN sensing procedure to perform full channel measurement based on the indication of threshold crossing by the associated communication apparatus.

Example 34. The communication method in accordance with Example 33 wherein initiating a WLAN sensing procedure comprises initiating the WLAN sensing procedure to perform full channel measurement based on a physical layer protocol data unit (PPDU) indicating threshold crossing by the associated communication apparatus.

Example 35. The communication method in accordance with Example 33 or Example 34 wherein initiating the WLAN sensing procedure comprises transmitting a sensing request frame including a WLAN sensing request to the associated communication apparatus.

Example 36. The communication method in accordance with Example 35 wherein transmitting the sensing request frame to the associated communication apparatus comprises soliciting feedback from the associated communication apparatus.

Example 37. The communication method in accordance with Example 36 wherein soliciting feedback from the associated communication apparatus comprises soliciting one of a null data packet (NDP), a partial feedback or an explicit feedback form the associated communication apparatus.

Example 38. The communication method in accordance with Example 37 wherein soliciting a NDP from the associated communication apparatus comprises performing the full channel measurement.

Example 39. The communication method in accordance with Example 37 wherein soliciting an explicit feedback from the associated communication apparatus comprises generating a NDP for transmission to the associated communication apparatus to perform full channel measurement and provide explicit channel measurement feedback.

Example 40. The communication method in accordance with Example 39 wherein soliciting an explicit feedback from the associated communication apparatus further comprises transmitting a staggered PPDU including extra-long training fields (LTFs) to the associated communication apparatus to provide the explicit channel measurement feedback.

Example 41. The communication method in accordance with Example 37 wherein soliciting a partial feedback from the associated communication apparatus comprises:

transmitting a long training field (LTF) included in a PPDU to the associated communication apparatus; and receiving channel quality information of the LTF from the associated communication apparatus.

What is claimed is:

1. A communication apparatus comprising:

a transceiver, which in operation, receives signals in a wireless local area network (WLAN); and circuitry, which in operation, demodulates and decodes the signals, the decoded signals comprising a first physical layer protocol data unit (PPDU) and a second PPDU, wherein, the circuitry, in operation, performs full channel measurement based on a first physical layer (PHY) header of the first PPDU and a second PHY header of the second PPDU, the first PHY header and the second PHY header include long training fields (LTFs) for estimating channel quality, the second PPDU is received by the transceiver subsequent to the first PPDU, and the circuitry, in operation, calculates a first channel measurement parameter based on the first PPDU, calculates a second channel measurement parameter based on the second PPDU, and performs full channel measurement based on a difference between the first channel measurement parameter and the second channel measurement parameter.

2. The communication apparatus in accordance with claim 1 wherein the first channel measurement parameter and the second channel measurement parameter comprise one of time reversal resonating strength (TRRS), signal-to-noise ratio (SNR) or detected channel energy.

3. The communication apparatus in accordance with claim 1 wherein the circuitry, in operation, performs full channel measurement based on the difference between the first channel measurement parameter and the second channel measurement parameter exceeding a threshold value.

4. The communication apparatus in accordance with claim 3 wherein the circuitry, in operation, generates an indication of threshold crossing based on the difference between the first channel measurement parameter and the second channel measurement parameter exceeding the threshold value, and wherein the transceiver, in operation, transmits the indication of threshold crossing in an uplink frame.

5. The communication apparatus in accordance with claim 4 wherein the uplink frame comprises one of a Block Ack frame, a sounding frame or a unicast action frame.

6. The communication apparatus in accordance with claim 3 wherein the transceiver, in operation, receives a threshold value signal in one of a beacon frame, a unicast management frame or a probe response frame, and wherein the circuitry, in operation, demodulates and decodes the threshold value signal to derive the threshold value.

7. The communication apparatus in accordance with claim 1 wherein the circuitry, in operation, initiates a beamforming procedure based on the first PHY header of the first PPDU and the second PHY header of the second PPDU.

8. A communication method, comprising:

receiving signals in a wireless local area network (WLAN);

demodulating and decoding the signals, the decoded signals comprising a first physical layer protocol data unit (PPDU) and a second PPDU; and performing full channel measurement based on a first physical layer (PHY) header of the first PPDU and a second PHY header of the second PPDU, wherein, the first PHY header and the second PHY header include long training fields (LTFs) for estimating channel quality, the second PPDU is received subsequent to the first PPDU, and the performing full channel measurement includes calculating a first channel measurement parameter based on the first PPDU, calculating a second channel measurement parameter based on the second PPDU, and performing the full channel measurement based on a difference between the first channel measurement parameter and the second channel measurement parameter.

9. The communication method of claim 8, wherein the first channel measurement parameter and the second channel measurement parameter comprise one of time reversal resonating strength (TRRS), signal-to-noise ratio (SNR) or detected channel energy.

10. The communication method of claim 8, wherein the full channel measurement is based on the difference between the first channel measurement parameter and the second channel measurement parameter exceeding a threshold value.

11. The communication method of claim 10, comprising:

generating an indication of threshold crossing based on the difference between the first channel measurement parameter and the second channel measurement parameter exceeding the threshold value; and transmitting the indication of threshold crossing in an uplink frame.

12. The communication method of claim 11, wherein the uplink frame comprises one of a Block Ack frame, a sounding frame or a unicast action frame.

13. The communication method of claim 11, comprising:

receiving a threshold value signal in one of a beacon frame, a unicast management frame or a probe response frame; and demodulating and decoding the threshold value signal to derive the threshold value.

14. The communication method of claim 8, comprising:

initiating a beamforming procedure based on the first PHY header of the first PPDU and the second PHY header of the second PPDU.

* * * * *